US011858508B2

(12) United States Patent
Phan et al.

(10) Patent No.: US 11,858,508 B2
(45) Date of Patent: *Jan. 2, 2024

(54) TRAJECTORY PREDICTION FROM PRECOMPUTED OR DYNAMICALLY GENERATED BANK OF TRAJECTORIES

(71) Applicant: Motional AD LLC, Boston, MA (US)

(72) Inventors: Tung Minh Phan, Garden Grove, CA (US); Eric Wolff, Boston, MA (US); Emilio Frazzoli, Newton, MA (US); Elena Corina Grigore, Boston, MA (US); Freddy Boulton, Boston, MA (US)

(73) Assignee: Motional AD LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,399

(22) Filed: Dec. 12, 2022

(65) Prior Publication Data

US 2023/0111121 A1 Apr. 13, 2023

Related U.S. Application Data

(63) Continuation of application No. 17/336,713, filed on Jun. 2, 2021, now Pat. No. 11,535,248, which is a
(Continued)

(51) Int. Cl.
*B60W 30/095* (2012.01)
*G01S 19/01* (2010.01)
(Continued)

(52) U.S. Cl.
CPC ....... *B60W 30/0956* (2013.01); *G01S 7/4814* (2013.01); *G01S 17/89* (2013.01);
(Continued)

(58) Field of Classification Search
CPC ......... B60W 30/0956; B60W 2556/10; B60W 2420/42; G01S 17/931; G01S 17/89; G01S 19/01; G05B 13/027; G05D 1/0221
See application file for complete search history.

(56) References Cited

U.S. PATENT DOCUMENTS 8,332,134 B2 * 12/2012 Zhang ................... G06F 18/256
701/301
9,805,595 B1 * 10/2017 Liebinger Portela .. G08G 1/012
(Continued)

FOREIGN PATENT DOCUMENTS

DE 102012009297 12/2012
DE 102017204404 6/2018
(Continued)

OTHER PUBLICATIONS

[No Author Listed], "Sae International Standards: Surface Vehicle Recommended Practice," SAE International, Sep. 30, 2016, 30 pages.
(Continued)

*Primary Examiner* — Luis A Martinez Borrero
(74) *Attorney, Agent, or Firm* — Fish & Richardson P.C.

(57) ABSTRACT

Among other things, techniques are described for predicting how an agent (e.g., a vehicle, bicycle, pedestrian, etc.) will move in an environment based on prior movement, the road network, the surrounding objects and/or other relevant environmental factors. One trajectory prediction technique involves generating a probability map for an agent's movement. Another trajectory prediction technique involves generating a trajectory lattice, for an agent's movement. In addition, a different trajectory prediction technique involves multi-modal regression where a classifier (e.g., a neural
(Continued)

network) is trained to classify the probability of a number of (learned) modes such that each model produces a trajectory based on the current input.

20 Claims, 20 Drawing Sheets

Related U.S. Application Data continuation of application No. 16/883,899, filed on May 26, 2020.

(60) Provisional application No. 62/932,164, filed on Nov. 7, 2019.

(51) Int. Cl.
  G01S 17/89     (2020.01)
  G01S 17/931    (2020.01)
  G01S 7/481     (2006.01)
  G05B 13/02     (2006.01)
  G06F 17/18     (2006.01)
  G05D 1/02      (2020.01)

(52) U.S. Cl.
  CPC ............ *G01S 17/931* (2020.01); *G01S 19/01* (2013.01); *G05B 13/027* (2013.01); *G05D 1/0221* (2013.01); *G06F 17/18* (2013.01); *B60W 2420/42* (2013.01); *B60W 2554/4044* (2020.02); *B60W 2556/10* (2020.02); *G05D 2201/0213* (2013.01)

(56) References Cited

U.S. PATENT DOCUMENTS

| | | | | |
|---|---|---|---|---|
| 10,663,305 | B2* | 5/2020 | Balu | G08G 1/012 |
| 11,230,297 | B2* | 1/2022 | Zhu | B60W 40/04 |
| 11,535,248 | B2* | 12/2022 | Phan | G01S 19/01 |
| 2010/0098295 | A1* | 4/2010 | Zhang | G08G 1/165 348/148 |
| 2010/0098297 | A1* | 4/2010 | Zhang | B60W 30/09 382/104 |
| 2010/0104137 | A1* | 4/2010 | Zhang | G06V 10/443 382/104 |
| 2010/0121577 | A1* | 5/2010 | Zhang | G06F 18/256 382/104 |
| 2017/0349181 | A1* | 12/2017 | Wei | B60W 60/0011 |
| 2018/0046192 | A1 | 2/2018 | Keller et al. | |
| 2018/0124423 | A1 | 5/2018 | Choi et al. | |
| 2018/0141544 | A1* | 5/2018 | Xiao | B60W 10/20 |
| 2019/0025841 | A1 | 1/2019 | Haynes et al. | |
| 2019/0072966 | A1 | 3/2019 | Zhang et al. | |
| 2019/0072973 | A1 | 3/2019 | Sun et al. | |
| 2019/0152490 | A1* | 5/2019 | Lan | G08G 1/166 |
| 2019/0176818 | A1 | 6/2019 | Movert et al. | |
| 2019/0221116 | A1* | 7/2019 | Powch | G08G 1/0112 |
| 2019/0250622 | A1* | 8/2019 | Nister | B60W 60/0027 |
| 2019/0283746 | A1* | 9/2019 | Shalev-Shwartz | G05D 1/0221 |
| 2019/0361454 | A1* | 11/2019 | Zeng | G05D 1/0214 |
| 2019/0367021 | A1* | 12/2019 | Zhao | B60W 60/0011 |
| 2019/0367022 | A1* | 12/2019 | Zhao | B60W 30/18154 |
| 2019/0369616 | A1* | 12/2019 | Ostafew | B60W 60/00274 |
| 2019/0369626 | A1* | 12/2019 | Lui | G05D 1/0221 |
| 2020/0018607 | A1* | 1/2020 | Balu | H04W 12/02 |
| 2020/0105129 | A1* | 4/2020 | Ikeda | G08G 1/04 |
| 2020/0150665 | A1* | 5/2020 | Refaat | B60W 60/0015 |
| 2020/0156632 | A1* | 5/2020 | Ding | G05D 1/0214 |
| 2020/0159232 | A1* | 5/2020 | Refaat | G06V 20/56 |
| 2020/0174481 | A1* | 6/2020 | Van Heukelom | B60W 60/0015 |
| 2020/0207369 | A1* | 7/2020 | Mehta | G06V 20/56 |
| 2020/0207375 | A1* | 7/2020 | Mehta | G06V 20/56 |
| 2020/0223451 | A1* | 7/2020 | Shashua | B60W 50/00 |
| 2020/0272160 | A1* | 8/2020 | Djuric | G06T 7/20 |
| 2020/0298891 | A1* | 9/2020 | Liang | G05D 1/0088 |
| 2020/0353920 | A1* | 11/2020 | Sun | B60W 30/18159 |
| 2020/0363800 | A1 | 11/2020 | Jojo-Verge et al. | |
| 2020/0398894 | A1 | 12/2020 | Hudecek et al. | |
| 2020/0409378 | A1 | 12/2020 | Benisch et al. | |
| 2020/0410062 | A1* | 12/2020 | O'Malley | G06F 30/15 |
| 2020/0410063 | A1* | 12/2020 | O'Malley | G06F 11/3476 |
| 2021/0001897 | A1* | 1/2021 | Chai | G08G 1/0129 |
| 2021/0035442 | A1* | 2/2021 | Baig | G08G 1/0112 |
| 2021/0108936 | A1* | 4/2021 | Seegmiller | B60W 60/0015 |
| 2021/0129836 | A1* | 5/2021 | Nguyen | B60W 50/0097 |
| 2021/0132619 | A1* | 5/2021 | Refaat | G06N 3/006 |
| 2021/0139026 | A1* | 5/2021 | Phan | G01S 13/89 |
| 2021/0155266 | A1* | 5/2021 | Sun | B60W 60/0027 |
| 2021/0181758 | A1* | 6/2021 | Das | G06T 7/215 |
| 2021/0221405 | A1* | 7/2021 | Zhu | B60W 60/00274 |
| 2021/0284147 | A1* | 9/2021 | Phan | G06F 17/18 |

FOREIGN PATENT DOCUMENTS

| | | |
|---|---|---|
| DE | 102017217056 | 3/2019 |
| EP | 3495219 | 6/2019 |
| JP | 2011-100492 | 5/2011 |
| JP | 2015-225366 | 12/2015 |
| KR | 10-1951595 | 2/2019 |
| WO | WO 2016/156236 | 10/2016 |

OTHER PUBLICATIONS

Cui et al., "Multimodal Trajectory Predictions for Autonomous Driving using Deep Convolutional Networks," EEE International Conference on Robotics and Automation (ICRA), May 20-24, 2019, 7 pages.

Lee et al., "MPC based Steering Control using a Probabilistic Prediction of Surrounding Vehicles for Automated Driving," Journal of Institute of Control, Robotics and Systems, Mar. 2015, 21(3):199-209 (with English Abstract).

* cited by examiner

TRAJECTORY PREDICTION FROM PRECOMPUTED OR DYNAMICALLY GENERATED BANK OF TRAJECTORIES

CROSS-REFERENCE TO RELATED APPLICATION

This application is a continuation of U.S. application Ser. No. 17/336,713, filed Jun. 2, 2021, now allowed, which is a continuation of U.S. application Ser. No. 16/883,899, filed May 26, 2020, which claim the benefit of U.S. Provisional Application 62/932,164, filed on Nov. 7, 2019, all of which is incorporated herein by reference in its entirety.

FIELD OF THE INVENTION

This description relates to trajectory prediction from a precomputed or dynamically generated bank of trajectories.

BACKGROUND

Autonomous vehicles have benefits over human-drive vehicles, e.g., reducing road fatalities, traffic congestion, parking congestion, and fuel efficiency. In making driving decisions, typical autonomous vehicle systems take account of objects—such as other vehicles and obstacles—of the surrounding environment that the autonomous vehicle system knows are in the environment of the vehicle by utilizing sensor data. Autonomous vehicles can benefit from predicting how other objects in the environment (e.g., other vehicles, bicycles, pedestrians, etc.) will move to improve trajectory planning.

DETAILED DESCRIPTION

Figure 1:
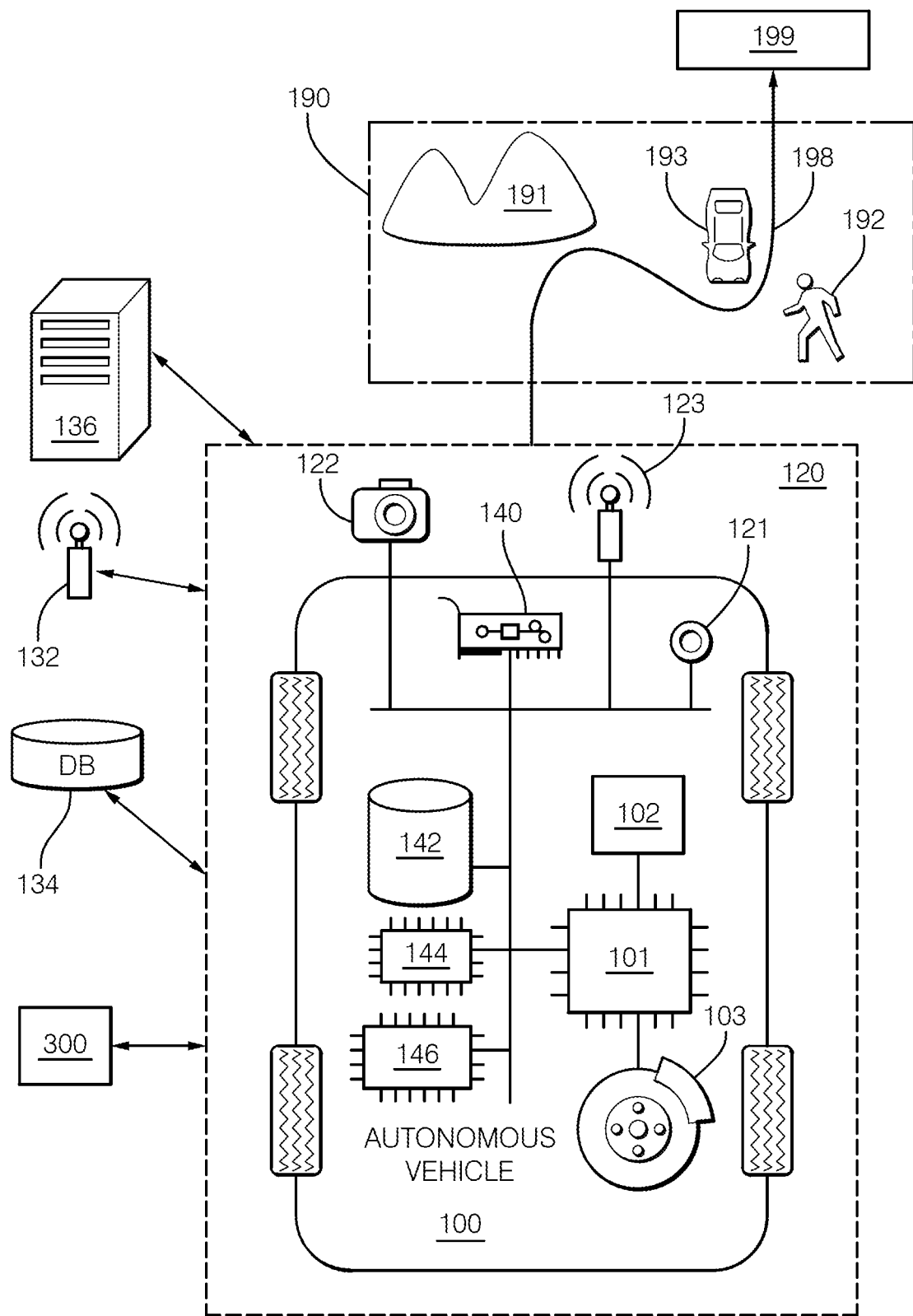
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Trajectory Prediction from Precomputed or dynamically generated Probability Map
8. Trajectory Prediction from a Lattice of Trajectories
9. Multi-modal Trajectory Prediction General Overview This document describes different techniques for predicting how an agent (e.g., a vehicle, bicycle, pedestrian, etc.) will move in an environment based on movement of the surrounding objects. One technique involves generating a probability map. The system receives location data and past trajectory data for objects within a certain distance of the agent. Those objects could have been detected by that agent (e.g., if the agent is a vehicle the objects could have been detected by the sensors of the vehicle). The system determines a set of features from those objects and combines the features in the set with motion data of the agent (e.g., speed acceleration, yaw rate, etc.). The system then generates (e.g., using a neural network) a probability map from the concatenated data set. The probability map includes multiple physical locations (e.g., squares of one meter resolution) such that each physical location is assigned a probability of the agent traversing that physical location. Based on the probability map, the system generates one or more predicted trajectories for the agent. The prediction system can use a neural network that is trained prior to use. During training, the input can include the trajectory that the agent traveled. Although this technique is described as making trajectory prediction for a single agent, the system is able to predict trajectories for multiple or all agents in a particular input set (e.g., a set of location data and past trajectory data).

Another technique involves generating a trajectory lattice. The system receives location data and past trajectory data for objects within a certain distance of the agent, determines a set of features from those objects, and combines the features in the set with motion data of an agent (e.g., speed, acceleration, yaw rate, etc.). In an embodiment, the past trajectory data can include past map data including traffic signal data, turn signal data, estimates of attentiveness, brake light indications, agent types, and other suitable past trajectory data. The system then generates (e.g., using a neural network) a trajectory lattice from the concatenated data set. The trajectory lattice includes multiple possible trajectories for the agent and corresponding probabilities. Based on the trajectory lattice, the system generates one or more predicted trajectories for the agent. Although this technique is described as making trajectory prediction for a single agent, the system is able to predict trajectories for multiple or all agents in a particular input set (e.g., a set of location data and past trajectory data).

A different technique involves training a classifier (e.g., neural network) for a multi-modal prediction method. The system receives location data and past trajectory data for objects within a certain distance of the agent, determines a set of features from those objects, and combines those features with motion data of an agent (e.g., speed, acceleration, yaw rate, etc.), as in the above two techniques. However, in this instance the received data is training data that also includes the trajectory that the agent actually traveled which is sometimes referred to as the ground truth. The system then generates (e.g., using a neural network) multiple predicted trajectories with each trajectory having a corresponding probability and calculates an angle between each predicted trajectory and a trajectory that the agent has traveled. The prediction system makes a determination of whether any of the angles are within a threshold (e.g., a threshold angle). Based on determining that none of the angles are within the threshold, the system selects a best trajectory (sometimes referred to as the best mode) using a function. In an embodiment, instead of using angles in this calculation, the system can use a different metric. Thus, the system can calculate, using a metric, a value between each predicted trajectory and a trajectory that the agent has traveled to determine whether each value is within a threshold. For example, the function can cause a random trajectory to be selected (e.g., using a random number generator). In an embodiment, a function can use one or more templates (e.g., template trajectories) for selecting the best trajectory. The templates can be static or dynamically generated based on a current state of the agent (e.g., speed, acceleration, yaw rate, or other suitable state component). The system computes a difference between the best trajectory and the trajectory the agent (e.g., using a multi-modal loss function) and adjusts weights of a model based on the difference (e.g., by minimizing loss over the training data). This process can be repeated for a training set (e.g., thousands of instances of location data and past trajectory data) to develop a model (e.g., a neural network) to predict multiple trajectories for an agent. Although this technique is described as making trajectory prediction for a single agent, the system is able to predict trajectories for multiple or all agents in a particular input set (e.g., a set of location data and past trajectory data).

Some of the advantages of these techniques include the ability to predict movement of an agent (e.g., a vehicle, a bicycle, or a pedestrian) and perform motion planning based on that movement. Thus, these techniques make autonomous vehicles safer and more efficient at navigation.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In an embodiment, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
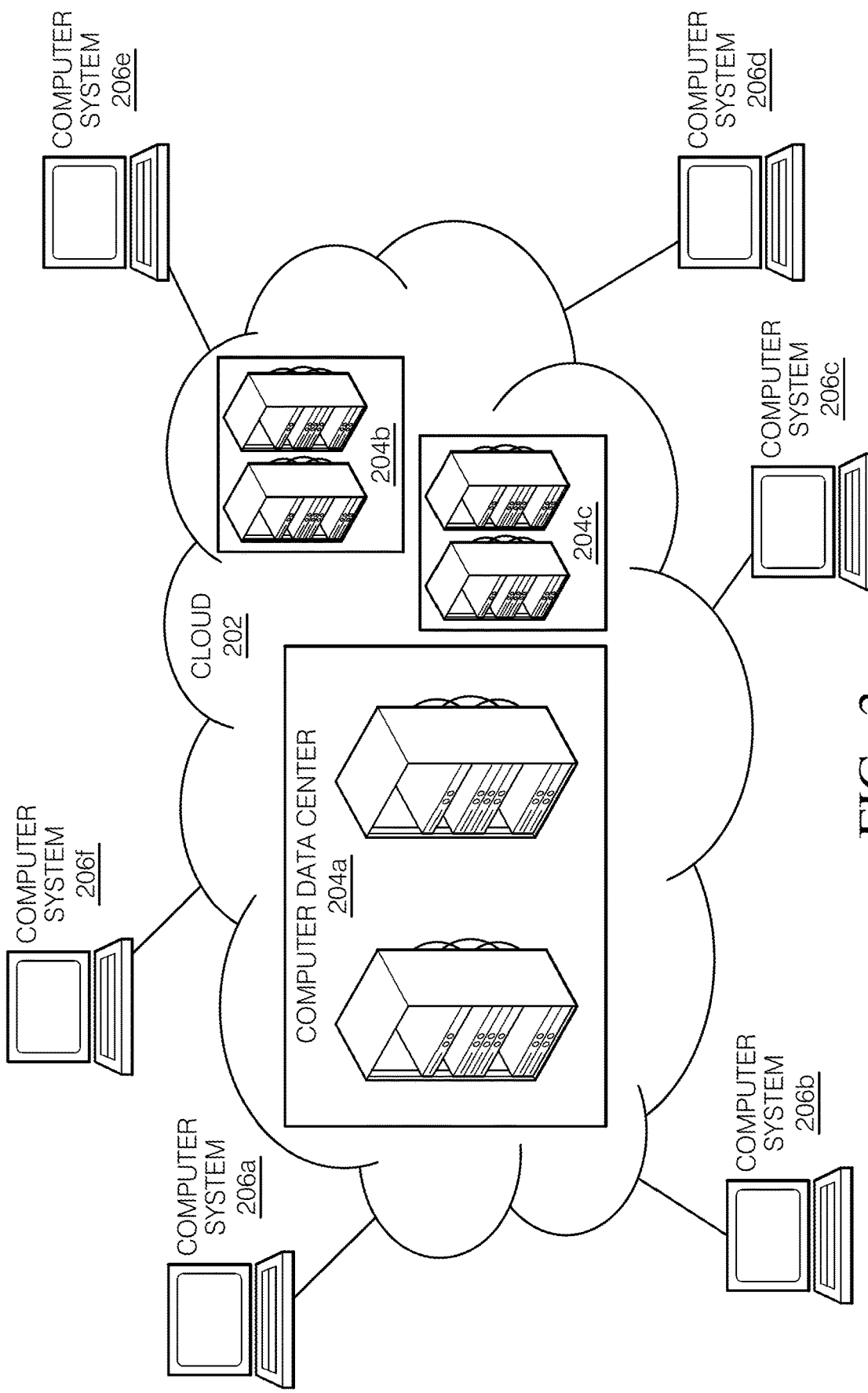
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In an embodiment, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
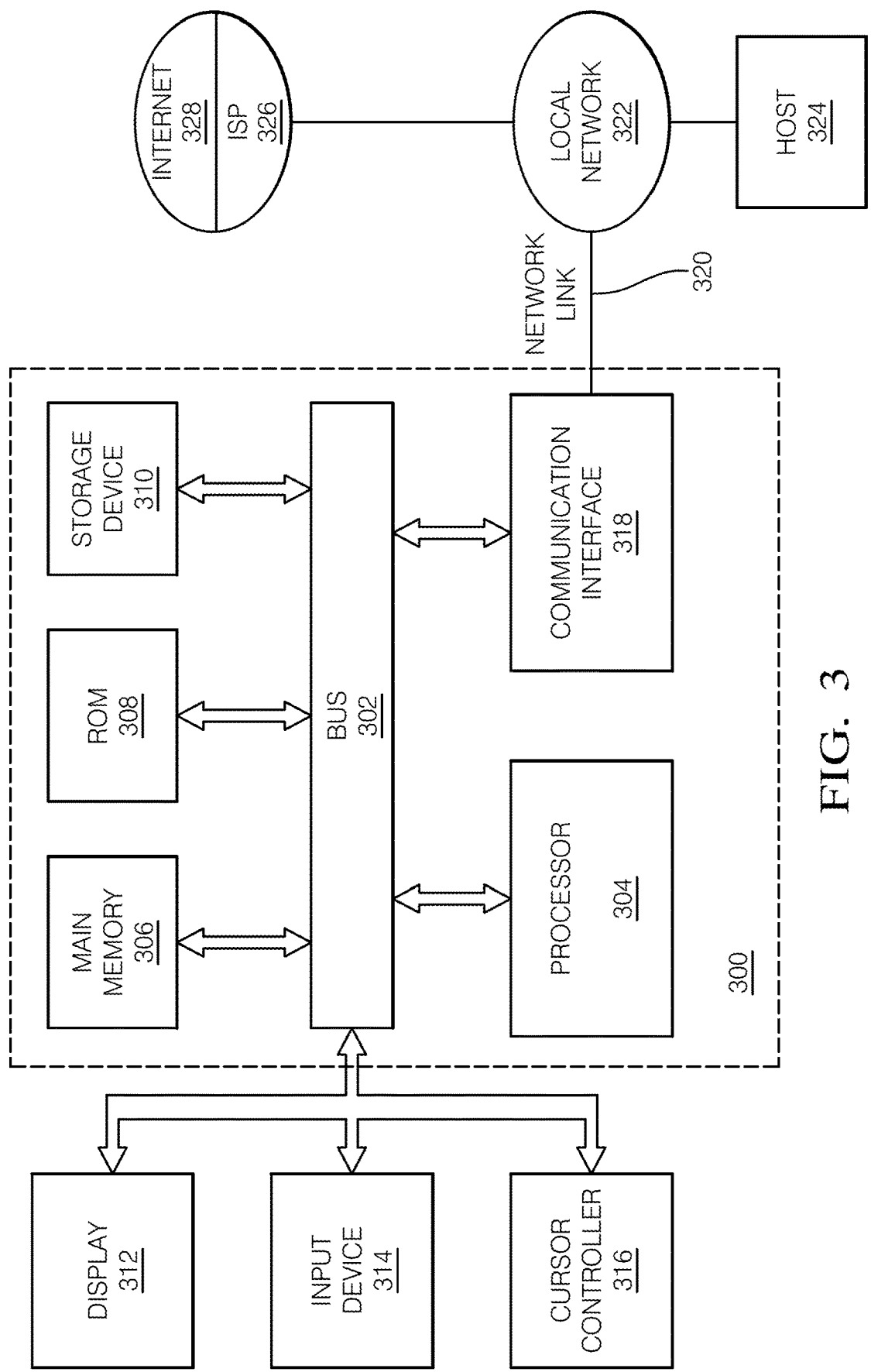
FIG. 3 illustrates a computer system.

FIG. 3 illustrates a computer system 300. In an embodiment, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In an embodiment, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In an embodiment, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
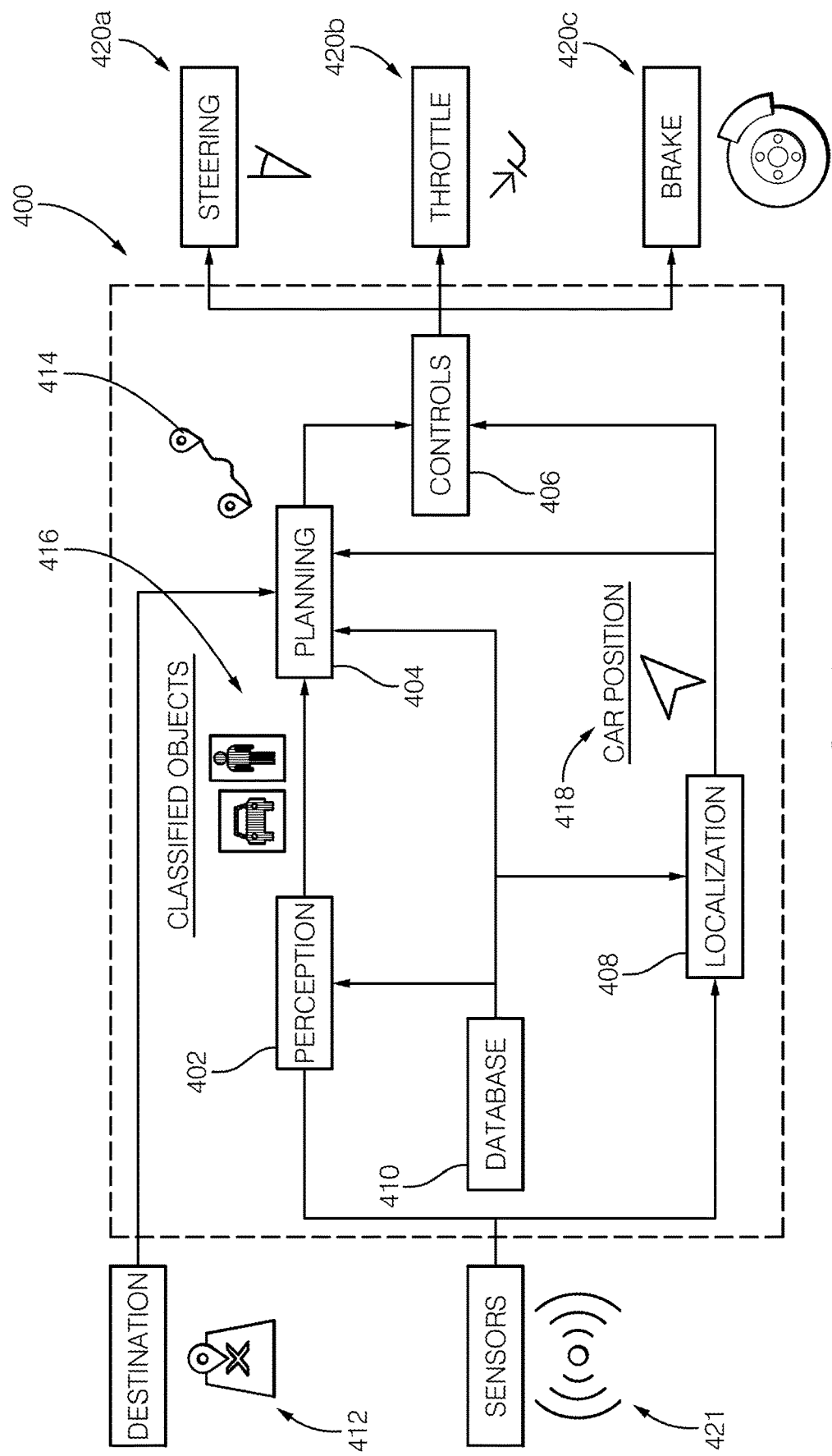
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, and/or ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
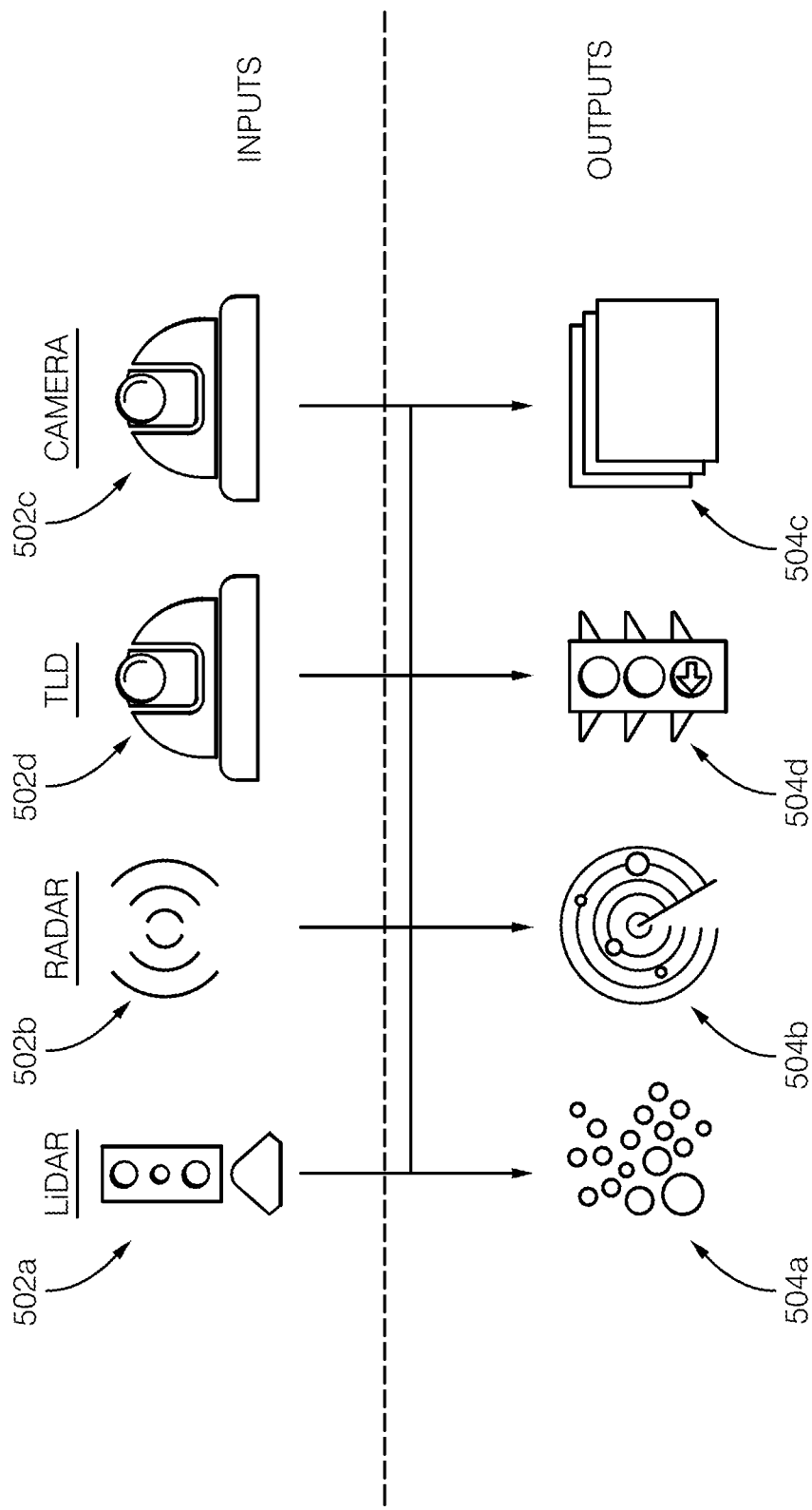
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
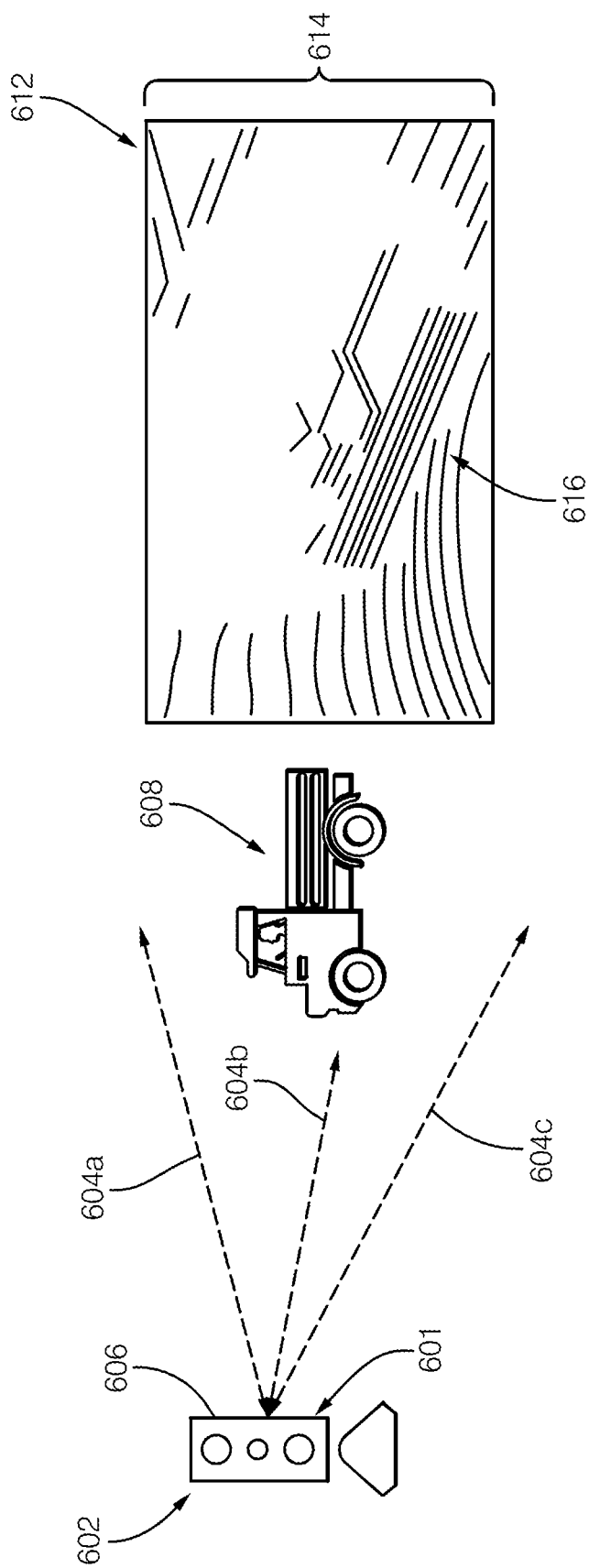
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
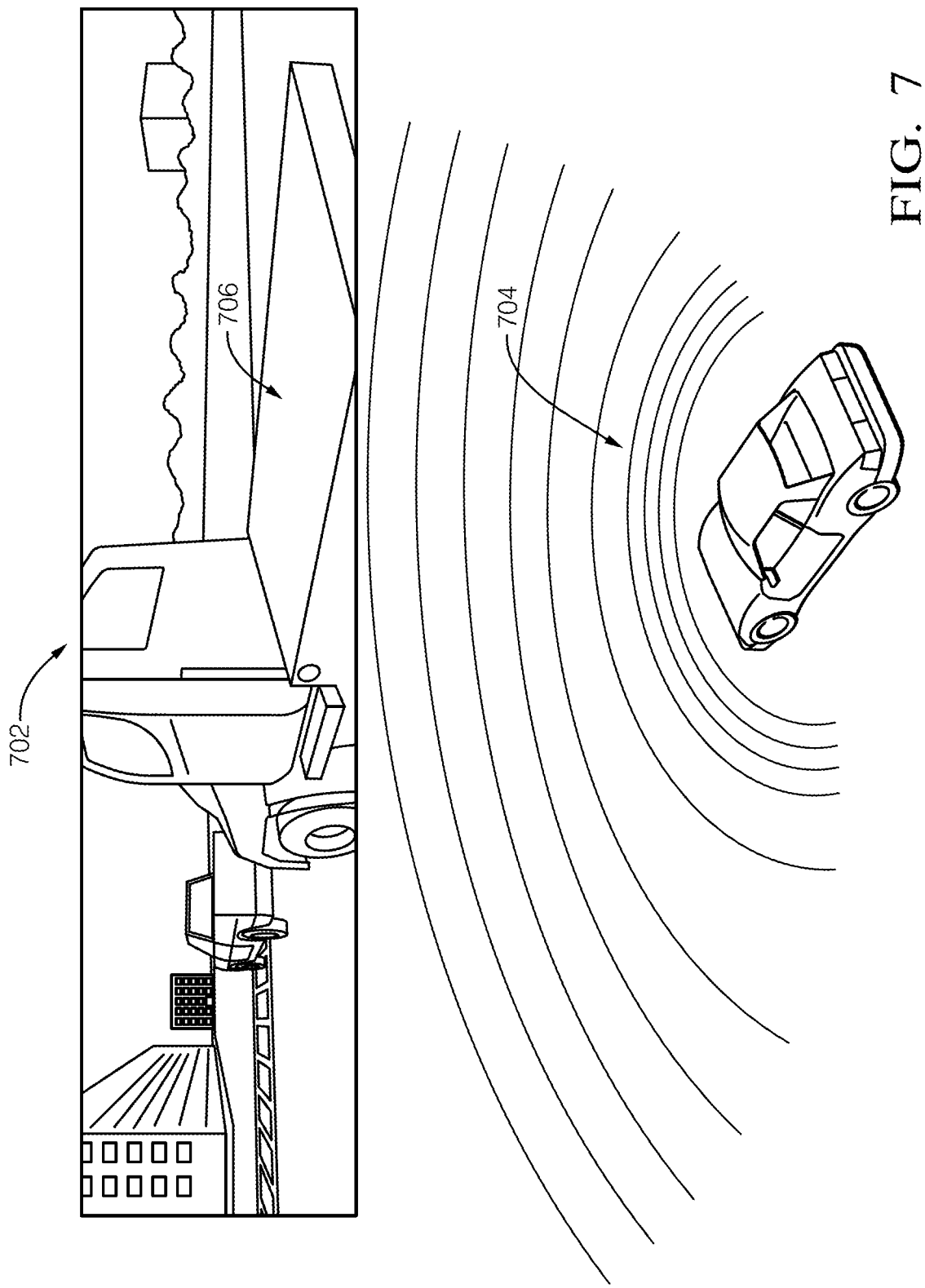
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
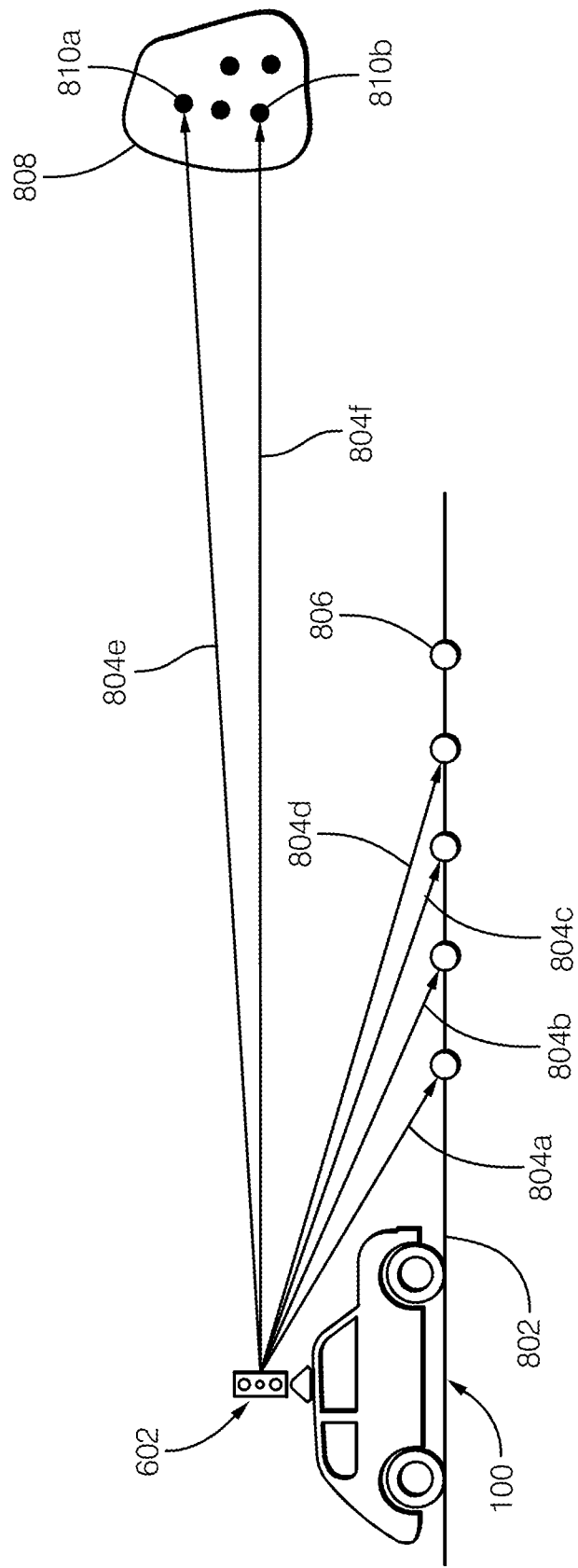
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
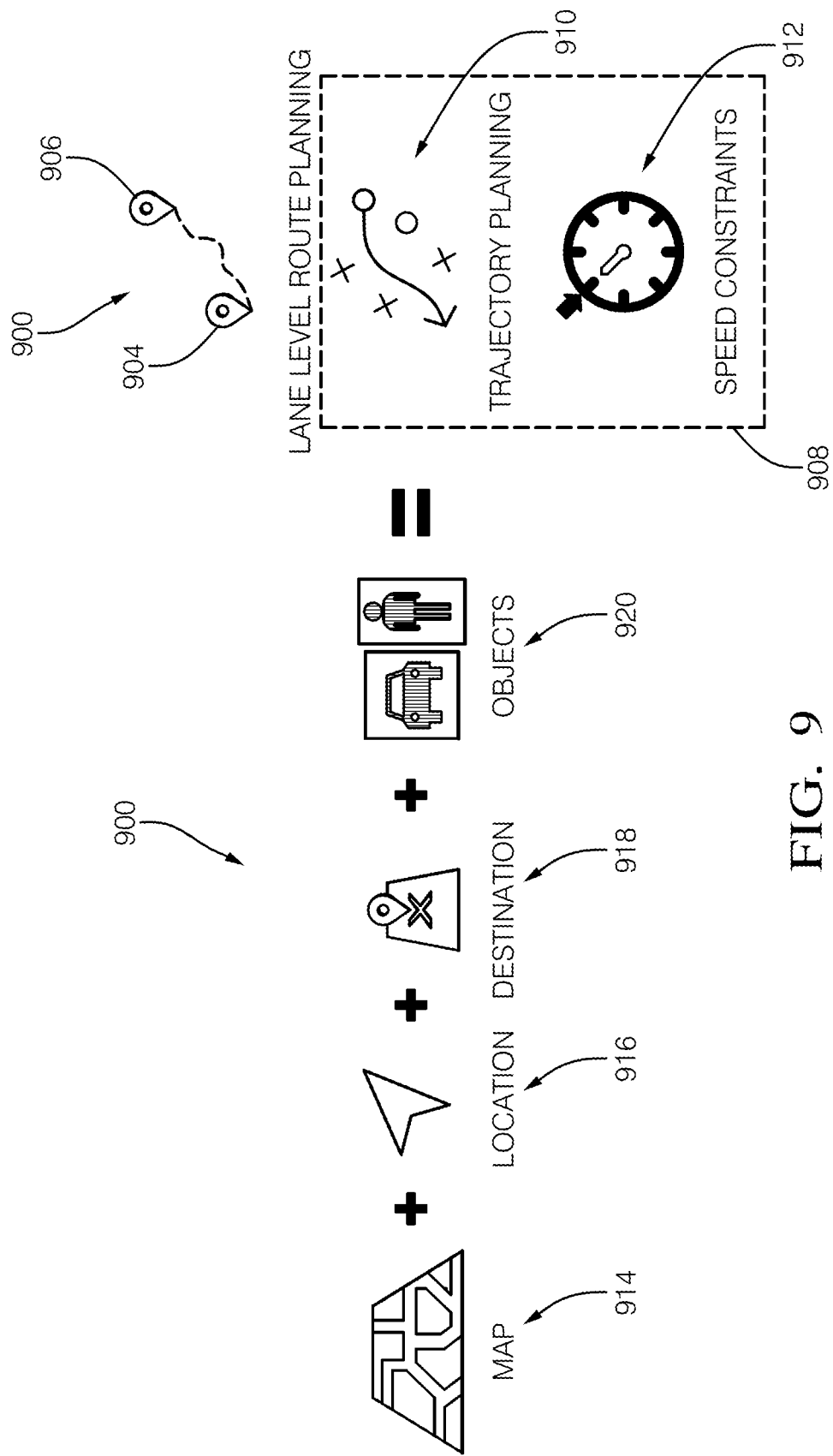
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in an embodiment, the lane-level route planning data 908 includes speed constraints 912 specific to a segment of the route 902. For example, if the segment includes pedestrians or un-expected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
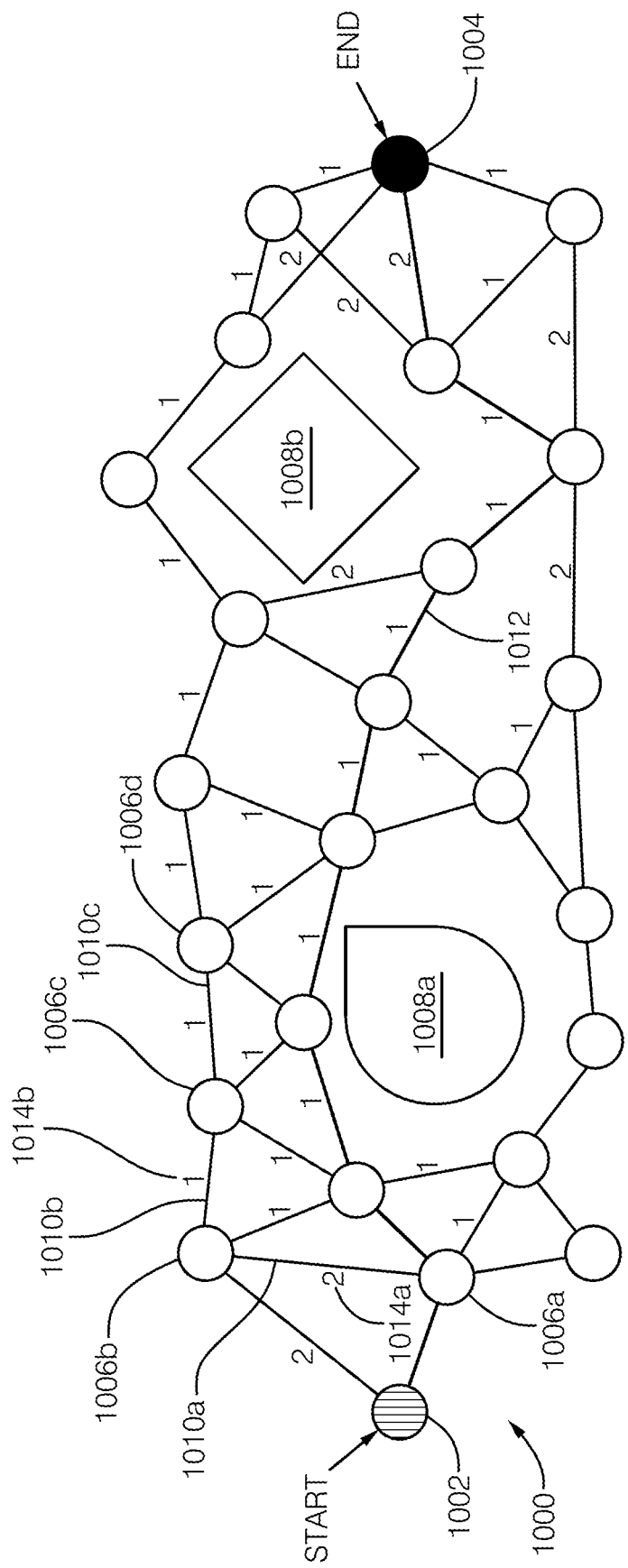
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
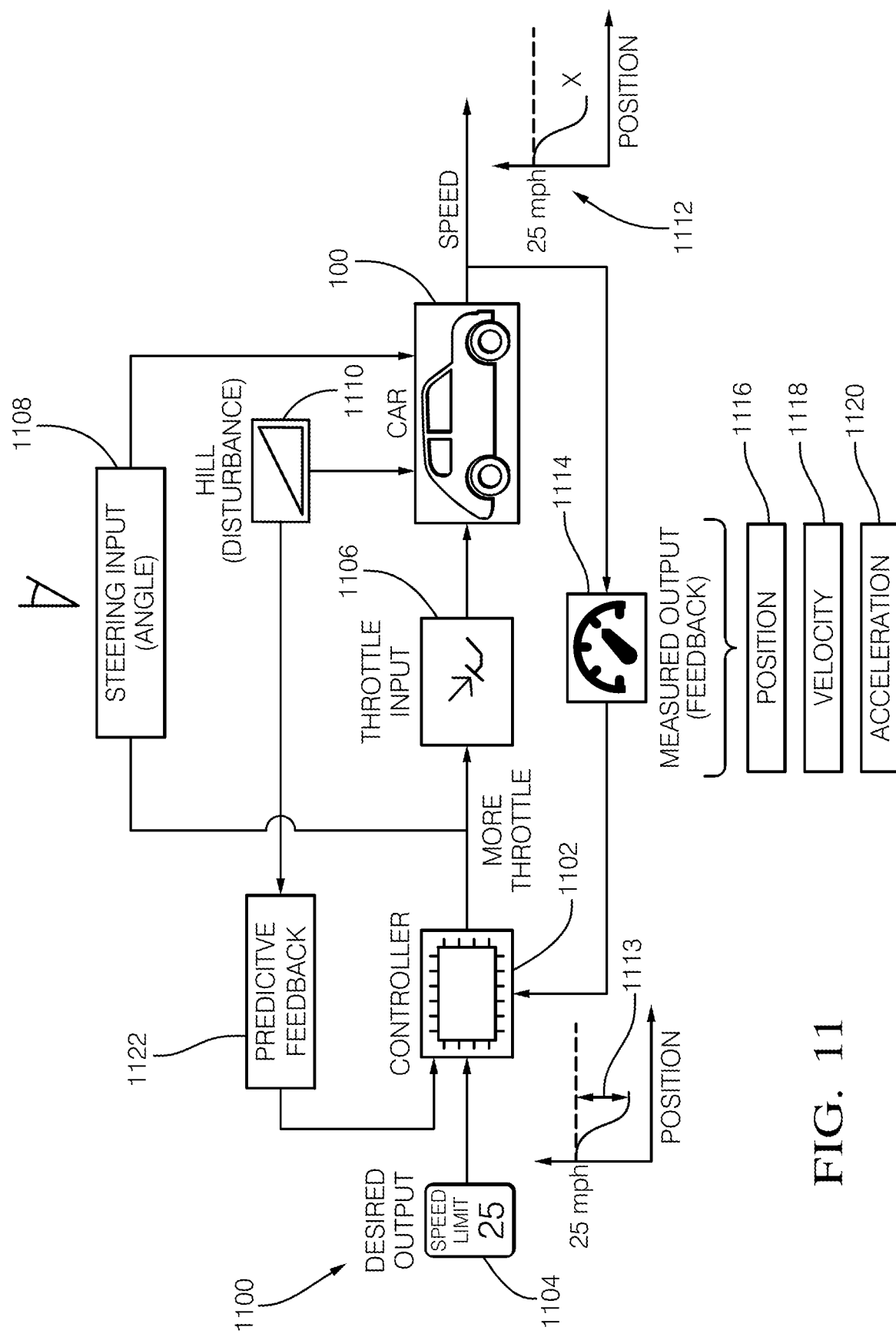
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
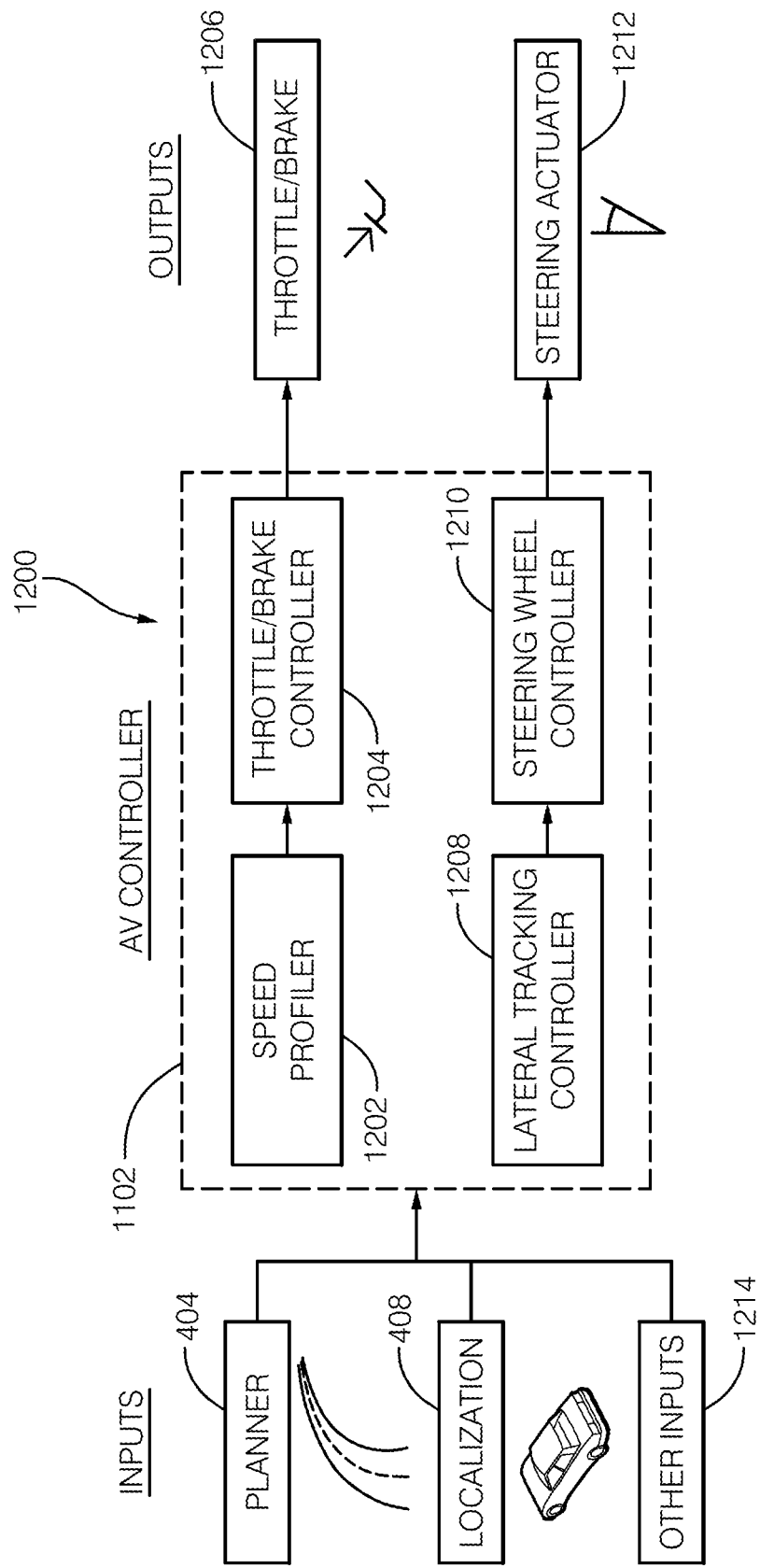
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Trajectory Prediction Overview

As mentioned above, this document describes different techniques for predicting how an agent (e.g., a vehicle, bicycle, pedestrian, etc.) will move in an environment based on movement of the surrounding objects. The techniques described below include a system that receives location data and past trajectory data for objects within a certain distance of the agent. As used herein, the term agent refers to an object (e.g., a vehicle, a bicycle, a pedestrian, or another suitable object) for which the system is attempting to predict a distribution over possible trajectories. As used herein, the term "location data" refers to a location of an object (e.g., a vehicle, a bicycle, a pedestrian, or another suitable object) in relation to an agent or another object in a detection range. As used herein, the term "past trajectory data" refers to a trajectory of a particular object (e.g., a vehicle, a bicycle, pedestrian, or another suitable object) for a specific amount of time (e.g., one second, two seconds, three seconds, or another suitable time). In an embodiment, the past trajectory data can include raw sensor data recorded over a past time interval (e.g., one second prior, two seconds prior, three seconds prior, or another suitable time).

Figure 13:
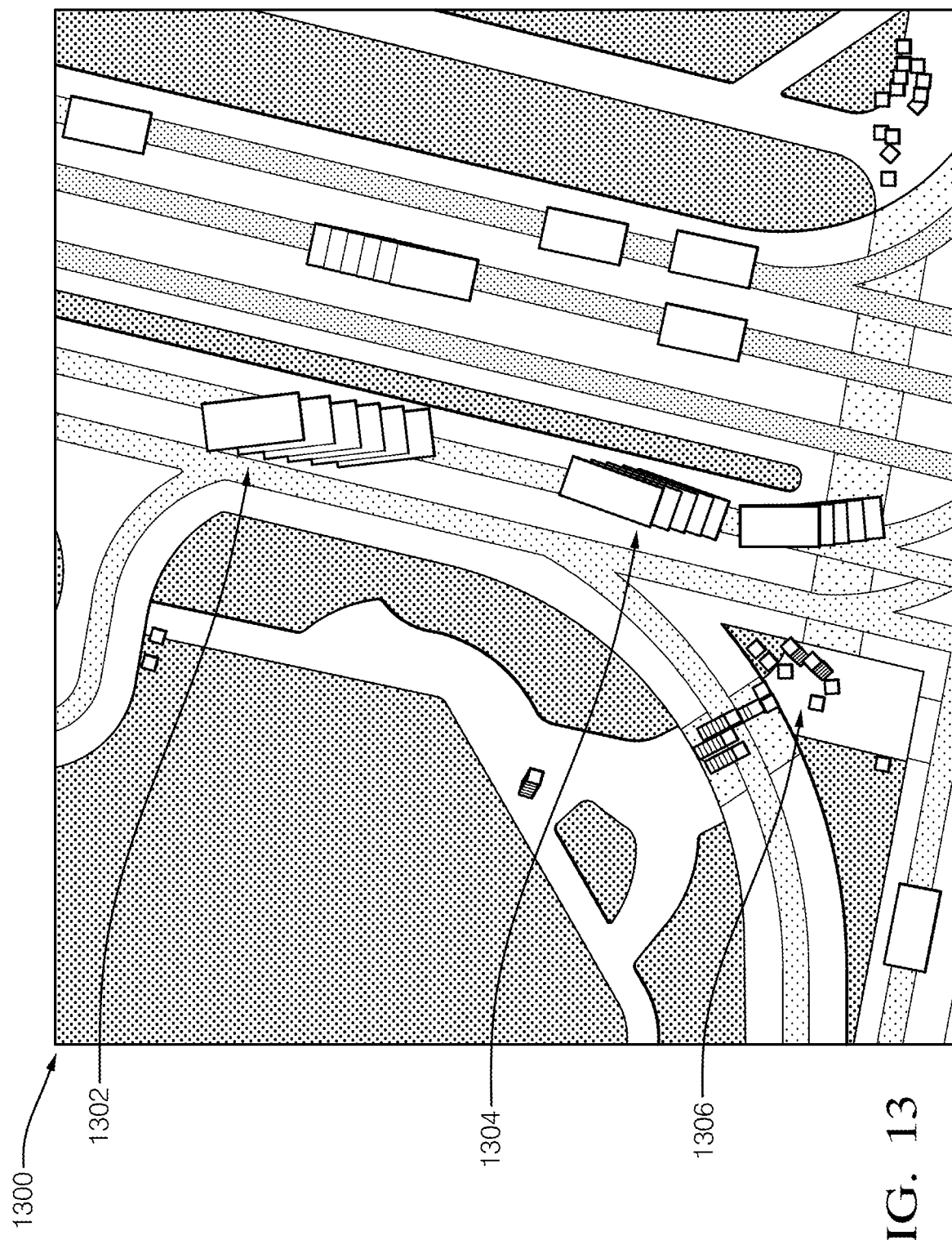
FIG. 13 shows an example of an image that can be received as location data and past trajectory data.

FIG. 13 shows an example of an image 1300 that can be received as location data and past trajectory data. The image 1300 includes depictions 1302 and 1304 of vehicles traveling along a lane with the current location of each vehicle and a past trajectory history of each vehicle. Another depiction 1306 shows multiple pedestrians in cross-walks and crossing a roadway. The image 1300 can be received by the system to perform various prediction techniques described below. In an embodiment, the image is constructed by overlapping map data, and other object data for multiple times (e.g., one second prior, two seconds prior, three seconds prior, or another suitable time).

The actions in various figures described below (e.g., FIG. 14, FIG. 16, and FIG. 19) can be performed by various components described earlier in this document. For example, one or more processors 146 of FIG. 1 can perform these actions. In an embodiment, some or all of the actions described below can be performed in a datacenter (e.g., datacenter 204A) or in multiple datacenters (e.g., datacenters 204A, 204B, and/or 204C as shown in FIG. 2). In an embodiment, the actions described below can be performed by the perception circuit 402, a planning circuit 404, and/or a combination of both of these circuits). However, for clarity, this disclosure will refer to a system that performs the actions as a prediction system.

Trajectory Prediction from Precomputed or Dynamically Generated Probability Map

One trajectory prediction technique involves generating a probability map, sometimes referred to as a cost map or a heat map. The prediction system receives location data and past trajectory data for objects within a certain distance of the agent. Those objects could have been detected by that agent (e.g., if the agent is a vehicle the objects could have been detected by the sensors of the vehicle). The prediction system determines a set of features from the objects in the set, combines those features with motion data of an agent (e.g., speed acceleration, yaw rate, etc.), and generates (e.g., using a neural network) a probability map from the concatenated data set. The probability map includes multiple physical locations (e.g., squares of one meter resolution) such that each physical location is assigned a probability of the agent traversing that physical location. Based on the probability map, the prediction system generates one or more predicted trajectories for the agent.

Figure 14:
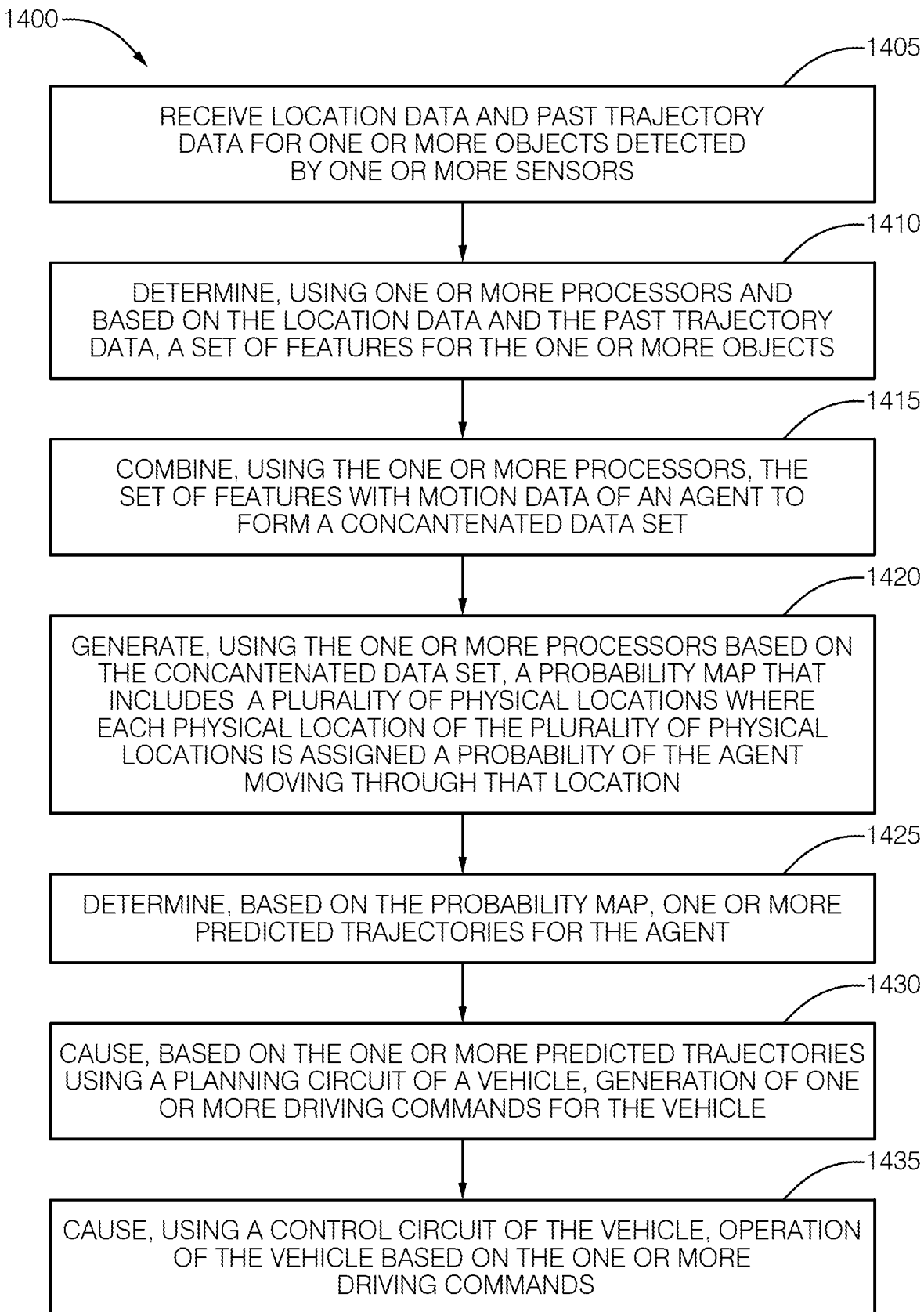
FIG. 14 is a block diagram of actions that a system can perform to predict one or more trajectories of an object using a probability map.

FIG. 14 is a block diagram of a process 1400 that can be performed to predict one or more trajectories of an object. At 1405, the prediction system receives location data and past trajectory data for one or more objects detected by one or more sensors. For example, as discussed above, image 1300 of FIG. 13 can be received as the location data and past trajectory data. In an embodiment, the prediction system can receive the location data and the past trajectory data in a different format. The prediction system can receive the past trajectory data for a past time interval (e.g., one second, two seconds, three seconds, or another suitable time interval). When the location data and the past trajectory data are received as part of an image, the image can include the past trajectory data for the one or more objects in a color coded format to indicate a corresponding past trajectory for each object of the one or more objects. For example, each of objects 1302 that is shown as having multiple colors with a gradually change of color to show time progression for the past trajectory data.

At 1410, the prediction system determines, using one or more processors and based on the location data and the past trajectory data, a set of features for the one or more objects. For example, in the embodiments where the location data and the past trajectory data are received as an image, the prediction system can input the image into a classifier, and receive from the classifier a plurality of features for the image. The features for the image can include velocities of various objects, locations and distances of those objects, and other suitable information. At 1415, the prediction system combines (e.g., using one or more processors) the set of features with motion data of an agent to form a concatenated data set. For example, the prediction system can add, to the feature set, a vector that includes a speed, acceleration and yaw rate of the agent.

At 1420, the prediction system generates, using the one or more processors based on the concatenated data set, a probability map that includes a plurality of physical locations where each physical location of the plurality of physical locations is assigned a probability of an agent moving through that location. In an embodiment, generating the probability map includes inputting the concatenated data set into a neural network. A neural network can be configured to accept the concatenated data set as input.

The neural network is trained using a training set. For example, the training set can include multiple sets of location data and past trajectory data for multiple objects. In an embodiment, the training set includes multiple images (e.g., in the same format as image 1300). In addition, the training set includes a trajectory of the agent (e.g., the path that the agent traveled). The location data and the trajectory data (e.g., the image in the same format as image 1300) can be input into a neural network and the neural network can return a predicted trajectory and a probability of that trajectory. In an embodiment the neural network returns multiple predicted trajectories and corresponding probabilities. The prediction system can compare the trajectory of the agent with a predicted trajectory to determine a difference between the two trajectories. The prediction system can take the difference and the probability and back-propagate that information through the neural network. For example, the prediction system can instruct the neural network to adjust node weights based on the differences and the probabilities. When multiple predicted trajectories and multiple probabilities are provided, the prediction system can generate multiple differences and back-propagate those differences and those probabilities through the neural network. The prediction system can repeat this process for every input of the training set to train the neural network.

In an embodiment, the prediction system can take the following actions to train the neural network. In an embodiment, the prediction system can perform the training using the resources (e.g., processor(s), memory, and other suitable resources) of a vehicle. The training can be performed outside of the vehicle (e.g., at a datacenter 204A as shown in FIG. 2). The prediction system can receive training location data and training past trajectory data (e.g., one second, two seconds, or another suitable time interval of movement) for one or more training objects. The training location data and the training past trajectory data can be received as an image in the same format as image 1300 of FIG. 13. The prediction system can determine, based on the training location data and the training past trajectory data, a set of training features for the one or more training objects. For example, when the location data and the past trajectory data are received as an image, the prediction system can input the image into a classifier, and receive from the classifier a plurality of features for the image. The features for the image can include velocities of various objects, locations and distances of those objects, and other suitable information. The prediction system combines the set of training features with training motion data of an agent to form a training concatenated data set. For example, the prediction system can add a vector that includes a speed, acceleration, and yaw rate for each object.

The concatenated data set is then used to generate a training probability map that includes a training plurality of physical locations, where each of the training plurality of physical locations is assigned a training probability of a training agent moving through that location. The prediction system then determines, based on the training probability map, one or more training trajectories for the training agent. This action and the above actions of training the neural network are similar to those actions when the neural network is executed to get a predicted trajectory. However, after a prediction is generated different actions are performed. Specifically, the prediction system compares the one or more training trajectories with a known trajectory of the training agent. Because the location data and the past trajectory data is part of the training set, the training set includes the trajectory that the agent moved along. Thus, one or more predicted trajectories (training trajectories) can be compared with the trajectory that the agent moved along. The prediction system then updates weights of a model (e.g., the neural network being trained) according to the comparing. As discussed above, the results of the comparison (e.g., difference(s) in the trajectories) can be back propagated through the neural network to adjust the weights of the neural network. Thus, updating the weights of the model according to the comparing can be performed by propagating a difference between each of the one or more training trajectories and the known trajectory through the model.

Figure 15:
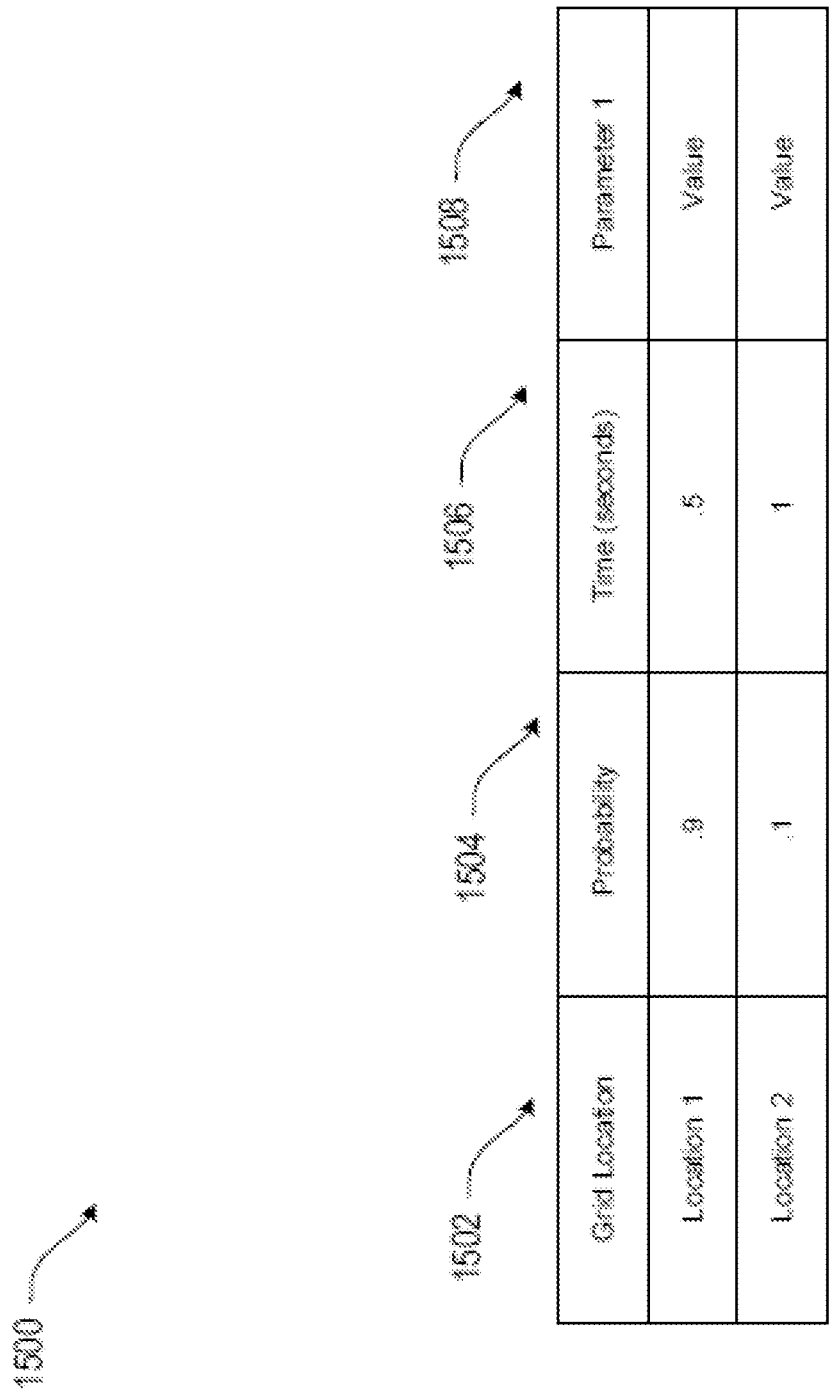
FIG. 15 is an example of a portion of a data structure for a probability map for an agent.

In an embodiment, the prediction system can generate a data structure for a grid representing a detection range of one or more sensors of the agent. The grid can include multiple locations, and can represent the probability map. The prediction system can assign, to each location within the grid, a probability that the agent will be present in that location within the grid. FIG. 15 is an example of a portion of a data structure for a probability map for an agent. As shown by data structure 1500 of FIG. 15, each location 1502 within the probability map (e.g., a grid) stores a probability 1504 for the corresponding location with the grid. In an embodiment, the data structure 1500 can stored a time 1506 for each location within the grid. The time indicates an elapsed time from the input of the location data and the past trajectory data as the time is elapsing from the scene. The data structure can include other parameters as indicated by Parameter 1 field 1508. In an embodiment, the grid can be adaptively sized. For example, the areas within the grid can be smaller sized spatially closer to the agent and larger sized spatially further away from the agent. This sizing enables for more prediction points close to the agent. In another example, the grid can be sized based on time. For example, for the first few seconds, the prediction system can generate more coordinates than for the next few seconds, enabling more prediction data to be processed.

Referring back to FIG. 14, at 1425, the prediction system determines, based on the probability map, one or more predicted trajectories for the vehicle. The prediction system can select a highest probability trajectory from the resulting probability map. During the selection process the prediction system can access the data structure associated with the grid and retrieve the highest probability locations within the grid for each time interval (e.g., one second, two seconds, and/or three seconds). The prediction system can then use the selected locations as the predicted trajectory for the agent. In an embodiment, the prediction system can select multiple trajectories. For example, there may be three predicted trajectories with different probabilities one for going straight, one for making a right turn, and one for making a left turn.

At 1430, the prediction system causes, based on the one or more predicted trajectories using a planning circuit of a vehicle, generation of one or more driving commands for the vehicle. The prediction system can be located, at least partially, in a vehicle that is using the prediction system to predict how other objects (e.g., agents) will move. Thus, the planning circuit of the vehicle can use one or more predicted trajectories for the objects to generate driving commands for the vehicle. Thus, a vehicle can include one or more computer-readable media storing computer-executable instructions and one or more processors configured to execute the computer-executable instructions carrying out process 1400.

In an embodiment, the prediction system, at least partially, resides outside of the vehicle (e.g., in a datacenter 204A as shown in FIG. 2). Thus, the prediction system can transmit the predicted trajectories for the objects detected by the vehicle to the vehicle and the vehicle (e.g., using the planning circuit) can generate driving commands based on the received trajectories. In an embodiment, the driving commands can be generated remotely from the vehicle (e.g., at a datacenter 204A as shown in FIG. 2) and are transmitted to the vehicle for execution.

At 1435, the prediction system causes, using a control circuit of the vehicle, operation of the vehicle based on the one or more driving commands. For example, the planning circuit can transmit the driving commands to the control circuit for execution. The control circuit of the vehicle can interpret and execute the commands to drive the vehicle on a trajectory that avoids the detected objects (e.g., agents) based on the predicted trajectory of those objects.

The actions described in relation to trajectory prediction from precomputed or dynamically generated probability map can be stored on a non-transitory computer-readable storage medium as one or more programs for execution by one or more processors (e.g., on a vehicle, at a datacenter, or another suitable location). The one or more programs can include instructions which, when executed by the one or more processors, cause performance of the computer implemented method(s) described above.

Trajectory Prediction from a Trajectory Lattice

Another trajectory prediction technique involves generating a trajectory lattice, for an agent (e.g., a vehicle, bicycle, pedestrian, or another suitable object). The prediction system receives location data and past trajectory data for objects within a certain distance of the agent. Those objects could have been detected by that agent (e.g., if the agent is a vehicle the objects could have been detected by the sensors of the vehicle). The prediction system determines a set of features from those objects, combines the features in the set with motion data of an agent (e.g., speed acceleration, yaw rate, etc.), and generates (e.g., using a neural network) a trajectory lattice for the agent. The trajectory lattice includes multiple trajectories for the agent. In an embodiment, each trajectory in the trajectory lattice has a corresponding probability. Based on the trajectory lattice, the prediction system generates one or more predicted trajectories for the agent.

Figure 16:
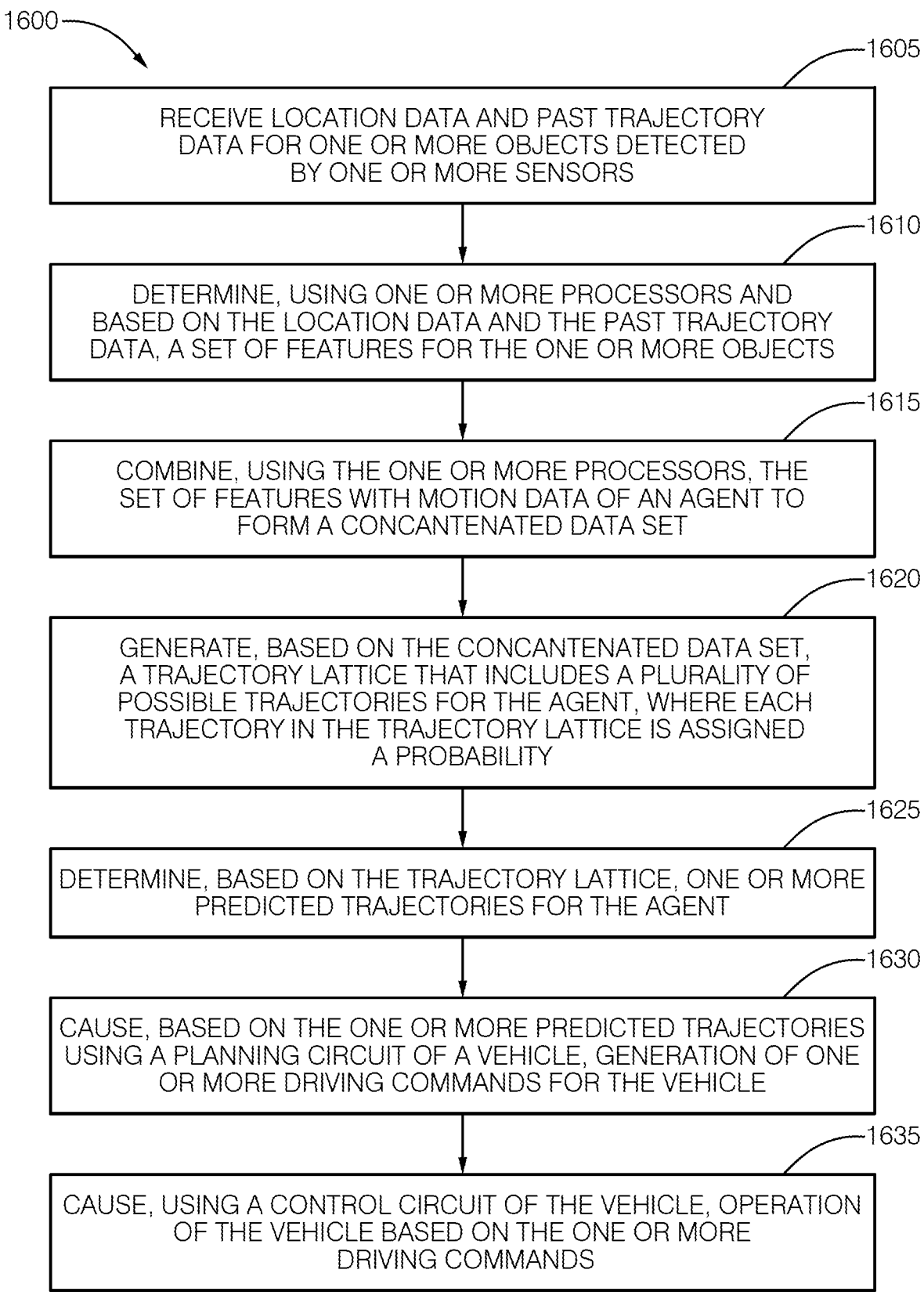
FIG. 16 is a block diagram of actions that a system can perform to predict one or more trajectories of an agent using a trajectory lattice.

FIG. 16 is a block diagram of a process 1600 that can be performed to predict one or more trajectories of an agent. At 1605, the prediction system receives location data and past trajectory data for one or more objects detected by one or more sensors. For example, as discussed above, image 1300 of FIG. 13 can be received as the location data and past trajectory data. In an embodiment, the prediction system can receive the location data and the past trajectory data in a different format than an image. The prediction system can receive the past trajectory data for a past time interval (e.g., one second, two seconds, three seconds, or another suitable time interval). When the location data and the past trajectory data are received as part of an image, the image can include the past trajectory data for the one or more objects in a color coded format to indicate a corresponding past trajectory for each object of the one or more objects. For example, each of objects 1302 that is shown as having multiple colors with a gradually change of color to show time progression for the past trajectory data.

At 1610, the prediction system determines, using one or more processors and based on the location data and the past trajectory data, a set of features for the one or more objects. For example, in the embodiments where the location data and the past trajectory data are received as an image, the prediction system can input the image into a classifier, and receive from the classifier a plurality of features for the image. The features for the image can include velocities of various objects, locations and distances of those objects, and other suitable information. At 1615, the prediction system combines (e.g., using one or more processors) the set of features with motion data of an agent to form a concatenated data set. For example, the prediction system can add, to the feature set, a vector that includes a speed, acceleration and yaw rate of the agent.

Figure 17:
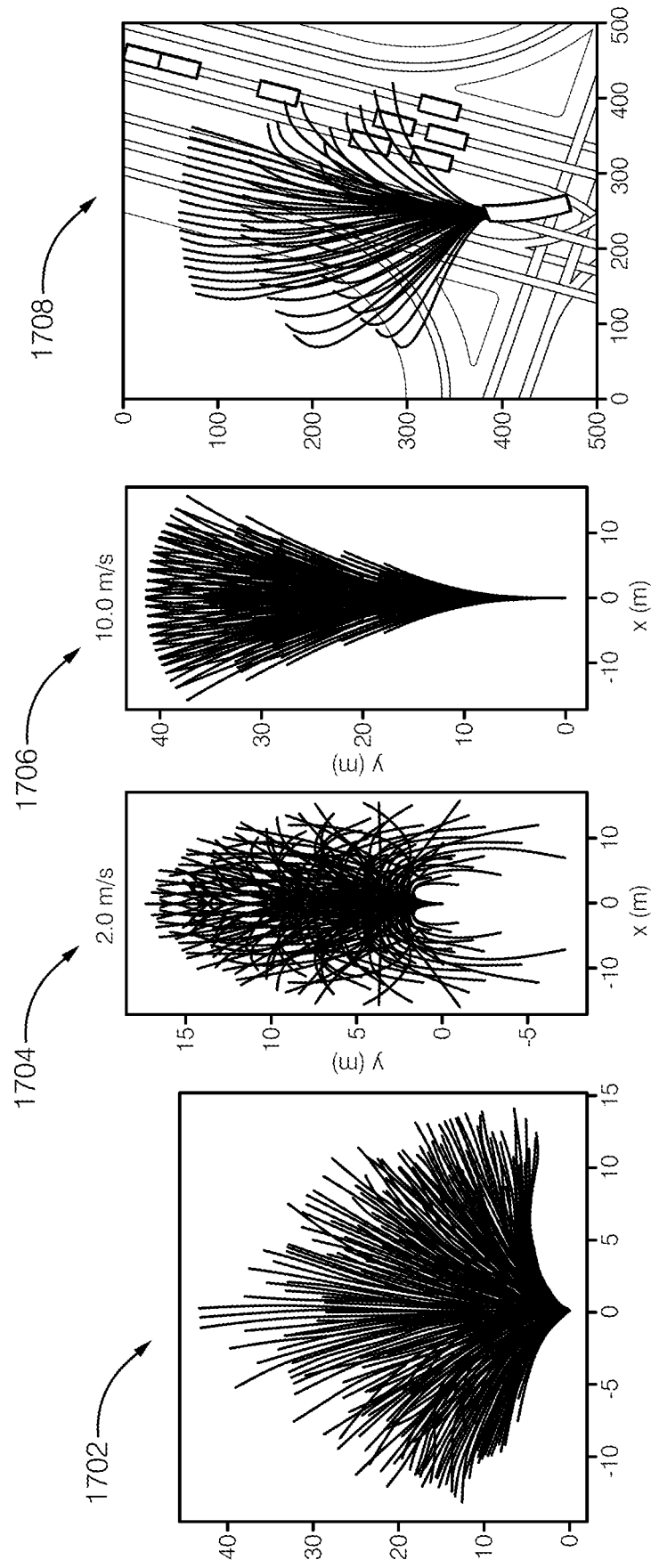
FIG. 17 illustrates various trajectory lattices with various trajectories.

At 1620, the prediction system generates, based on the concatenated data set, a trajectory lattice that includes a plurality of possible trajectories for the agent, where each trajectory in the trajectory lattice is assigned a probability. For example, the prediction system can input the concatenated data set into a neural network and receive, from the neural network, data for the trajectory lattice. FIG. 17 shows one possible trajectory lattice 1702 that can be generated by the prediction system. In an embodiment, the prediction system generates a data structure for the trajectory lattice. The data structure can include a plurality of fields for each trajectory in the trajectory lattice. The fields can include a coordinate field for storing the coordinates for each trajectory and a probability field for storing a probability for each trajectory. Other fields can be included in the trajectory lattice.

In an embodiment, the prediction system can use a neural network (e.g., previously trained) to generate the trajectory lattice. The prediction system can take the following actions to train the neural network. The prediction system can perform the training using the resources (e.g., processor(s), memory, and other suitable resources) of a vehicle. In an embodiment, the training is performed outside of the vehicle (e.g., at a datacenter 204A as shown in FIG. 2). The prediction system can receive training location data and training past trajectory data (e.g., one second, two seconds, or another suitable time interval of movement) for one or more training objects. The training location data and the training past trajectory data can be received as an image in the same format as image 1300 of FIG. 13. The prediction system can determine, based on the training location data and the training past trajectory data, a set of training features for the one or more training objects. For example, when the location data and the past trajectory data are received as an image, the prediction system can input the image into a classifier, and receive from the classifier a plurality of features for the image. The features for the image can include velocities of various objects, locations and distances of those objects, and other suitable information. The prediction system combines the set of training features with training motion data of an agent to form a training concatenated data set. For example, the prediction system can add a vector that includes a speed, acceleration, and yaw rate for each object.

The concatenated data set is then used to generate a training trajectory lattice that includes a training plurality of predicted trajectories, where each of the training plurality of predicted trajectories is assigned a training probability of a training agent (e.g., a probability that the agent will travel the specific trajectory). The prediction system then determines, based on the training trajectory lattice, one or more training trajectories for the training agent. This action and the above actions of training the neural network are similar to those actions when the neural network is executed to get a predicted trajectory. However, after a prediction is generated different actions are performed. Specifically, the prediction system compares the one or more training trajectories with a known trajectory of the training agent. Because the location data and the past trajectory data is part of the training set, the training set includes the trajectory that the agent moved along. Thus, one or more predicted trajectories (training trajectories) can be compared with the trajectory that the agent moved along. The prediction system then updates weights of a model (e.g., the neural network being trained) according to the comparing. As discussed above, the results of the comparison (e.g., difference(s) in the trajectories) can be back propagated through the neural network to adjust the weights of the neural network. Thus, updating the weights of the model according to the comparing can be performed by propagating a difference between each of the one or more training trajectories and the known trajectory through the model. This process can be repeated for each set of training data available. Thus, the trajectory lattice can be dynamically generated based on agent state (e.g., speed, acceleration, yaw rate, and/or another state component). As discussed above, in an embodiment, the trajectory lattice can also be based on environmental context for the agent (e.g., road network, map data, other objects, etc.).

Referring back to FIG. 16, at 1625, the prediction system determines, based on the trajectory lattice, one or more predicted trajectories for the agent. For example, the prediction system can select a trajectory with a highest probability. In an embodiment, the prediction system uses motion data of the agent to determine the one or more predicted trajectories. The prediction system can receive one or more of speed, acceleration, and yaw rate of the agent, and identify, in the trajectory lattice, those trajectories that the agent cannot travel based on the one or more of the speed, acceleration, and yaw rate of the agent. The prediction system can remove those trajectories from the trajectory lattice. The prediction system can select one or more trajectories from the updated trajectory lattice (e.g., based on a probability of each trajectory in the trajectory lattice).

Trajectory lattice 1704 and trajectory lattice 1706 illustrate different possible trajectories based on the speed of the vehicle. Trajectory lattice 1704 illustrates possible trajectories for the speed of two meters per second of the agent. Based on that speed, there are many trajectories in many directions that are possible. Trajectory lattice 1706 illustrates possible trajectories for the speed of ten meters per second. As illustrated in trajectory lattice 1706, the agent (e.g., a vehicle) is unable to make certain turns at that speed, thus those trajectories requiring such turns are not included (e.g., are removed) from trajectory lattice 1706. To identify trajectories that are not possible to execute at certain speeds, the prediction system can store (e.g., for each object type such as a vehicle, bicycle, pedestrian, or other object types) various maneuvers (e.g., turns) that cannot be executed at corresponding speeds. For example, if a U-turn maneuver cannot be executed at the speed of ten meters per second, the prediction system can store that information and access that information to prune the trajectory lattice accordingly.

In an embodiment, the prediction system uses road rules data for determining one or more predicted trajectories. The prediction system can receive one or more of road rules data (e.g., data representing traffic rules) and road marking data (e.g., lane markings, cross-walk markings, etc.). The data representing traffic rules can include speed limit data, traffic light data (e.g., green, red, or yellow), and other suitable traffic rules data. The road marking data can include lane markings (e.g., which lanes travel in which directions), cross-walk markings (e.g., for determining where pedestrians are likely to cross), and other suitable road marking data.

The prediction system can identify, in the trajectory lattice, those trajectories that the agent cannot travel based on the one or more of the road rules data and the road marking data, and remove those trajectories from the trajectory lattice. For example, if a predicted trajectory exists where an agent (e.g., a vehicle) makes a left turn, but according to the road rules a left turn is not allowed at that location, the prediction system can remove that rejection from the rejection lattice.

Trajectory lattice 1708 illustrates a trajectory lattice with a number of trajectories removed based on road rules and/or road markings. The illustration shows that there is no trajectories for turning left (e.g., because turning left would require going again direction of the traffic.

Referring back to FIG. 16, at 1630, the prediction system causes, based on the one or more predicted trajectories using a planning circuit of a vehicle, generation of one or more driving commands for the vehicle. In an embodiment, the prediction system is located, at least partially, in a vehicle that is using the prediction system to predict how agents (e.g., vehicles, pedestrians, bicyclists, and/or other suitable agents) will move. Thus, the planning circuit of the vehicle can use one or more predicted trajectories for the objects to generate driving commands for the vehicle. Thus, a vehicle can include one or more computer-readable media storing computer-executable instructions and one or more processors configured to execute the computer-executable instructions carrying out process 1600.

In an embodiment, the prediction system, at least partially resides outside of the vehicle (e.g., in a datacenter 204A as shown in FIG. 2). Thus, the prediction system can transmit the predicted trajectories for the objects detected by the vehicle to the vehicle and the vehicle (e.g., using the planning circuit) can generate driving commands based on the received trajectories. Thus, the driving commands can be generated remotely from the vehicle (e.g., at a datacenter 204A as shown in FIG. 2) and are transmitted to the vehicle for execution.

At 1635, the prediction system causes, using a control circuit of the vehicle, operation of the vehicle based on the one or more driving commands. For example, the planning circuit can transmit the driving commands to the control circuit for execution. The control circuit of the vehicle can interpret and execute the commands to drive the vehicle on a trajectory that avoids the detected objects (e.g., agents) based on the predicted trajectory of those objects.

The actions described in relation to trajectory prediction from a trajectory lattice can be stored on a non-transitory computer-readable storage medium as one or more programs for execution by one or more processors (e.g., on a vehicle, at a datacenter, or another suitable location). The one or more programs can include instructions which, when executed by the one or more processors, cause performance of the computer implemented method(s) described above.

Figure 18:
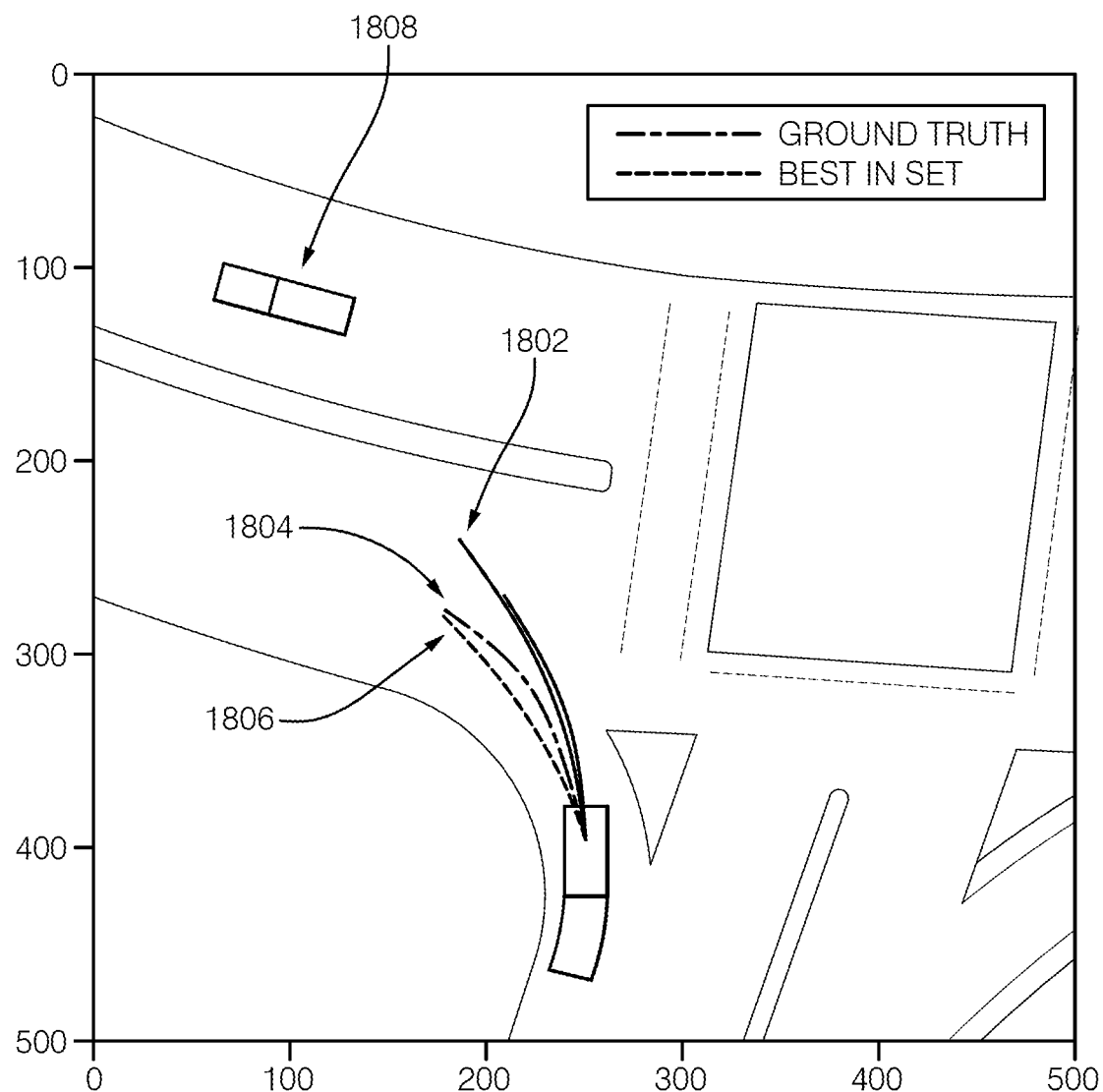
FIG. 18 illustrates a multiple predicted trajectories and the traveled trajectory of the agent.

FIG. 18 illustrates a multiple predicted trajectories and the traveled trajectory of an agent (a vehicle in this instance). The traveled trajectory is sometimes referred to as ground truth. Trajectories 1802 and 1806 show two predicted trajectories while trajectory 1804 illustrates the traveled trajectory. As illustrated from FIG. 18, trajectory 1806 is the best trajectory in the set of predicted trajectories because it is the closest to the traveled trajectory (the ground truth).

Trajectory Prediction from Multi-Modal Regression

Another trajectory prediction technique involves training a classifier (e.g., a neural network) to generate multiple trajectory predictions for an agent (e.g., a vehicle, bicycle, pedestrian, or another suitable object). Specifically, the model regresses coordinates and also applies a classification component to the loss such that probability values associated with each of the regressed trajectories are produced. The data being used in this embodiment is training data that also includes trajectories that the agent has traveled. As part of the training process the prediction system can use that data, as described below. The prediction system receives location data and past trajectory data for objects within a certain distance of the agent. Those objects could have been detected by that agent (e.g., if the agent is a vehicle the objects could have been detected by the sensors of the vehicle). The prediction system learns or determines a set of features from those objects and combines the features in the set with motion data of an agent (e.g., speed acceleration, yaw rate, etc.). The prediction system generates a plurality of predicted trajectories (e.g., by regressing to the coordinates, and using the classification component in the loss to predict probabilities associated with those trajectories), based on the concatenated data set. The prediction system then uses angles between the predicted trajectories to select a trajectory out of the plurality of predicted trajectories that best matches the ground truth (i.e., the traveled trajectory). The selected trajectory is then used to compute how far off the prediction was from the ground truth. That information is then used to train the neural network. In an embodiment, instead of using angles between the predicted trajectories and the traveled trajectory to train the model, the system can use a different metric. Based on the trained model, the prediction system generates one or more predicted trajectories for the agent and uses that information in the planning and driving algorithms of a vehicle.

Figure 19:
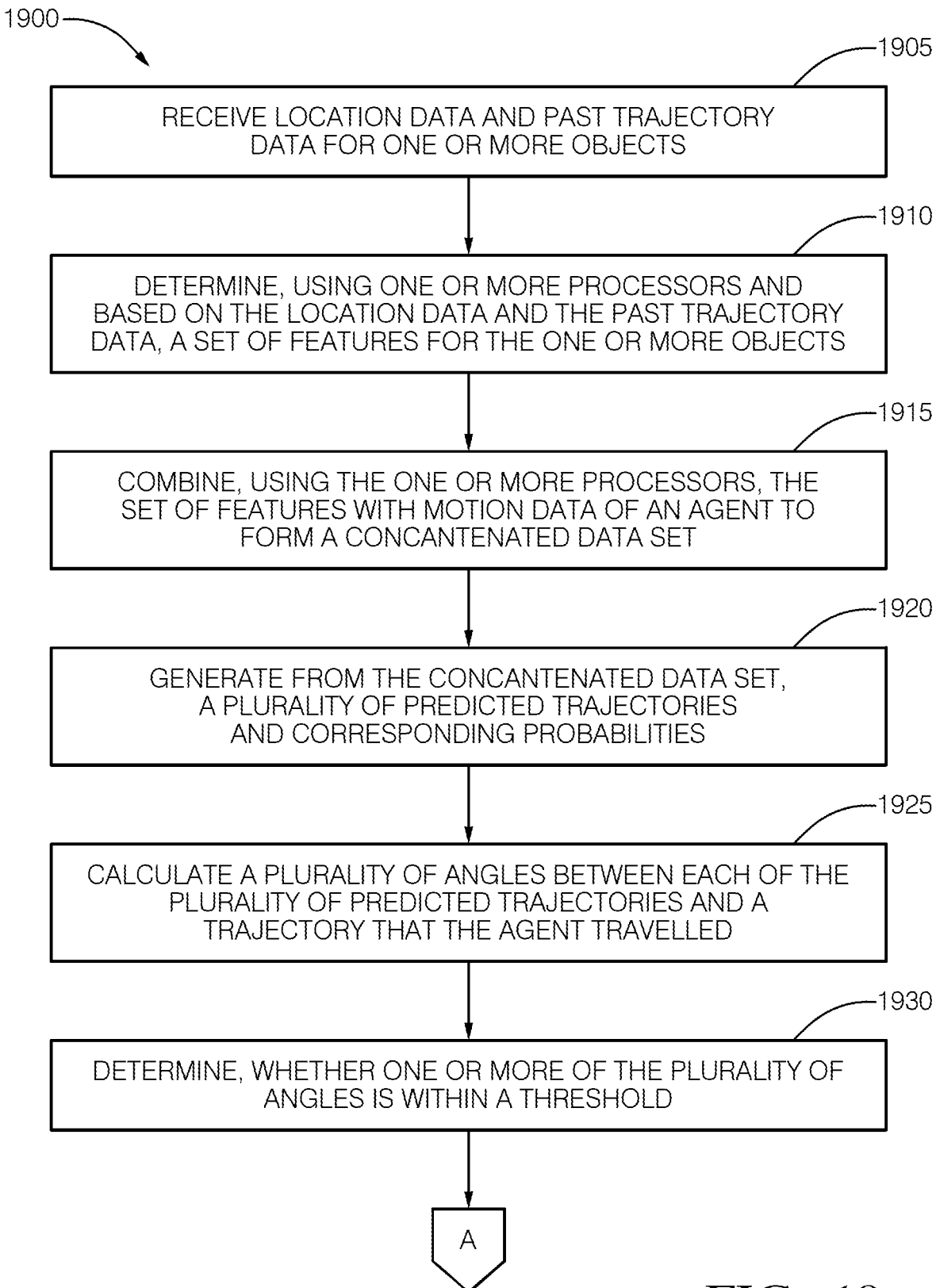
FIG. 19 is a block diagram of actions that a system can perform to train a model for multi-modal trajectory predictions.
Figure 19:
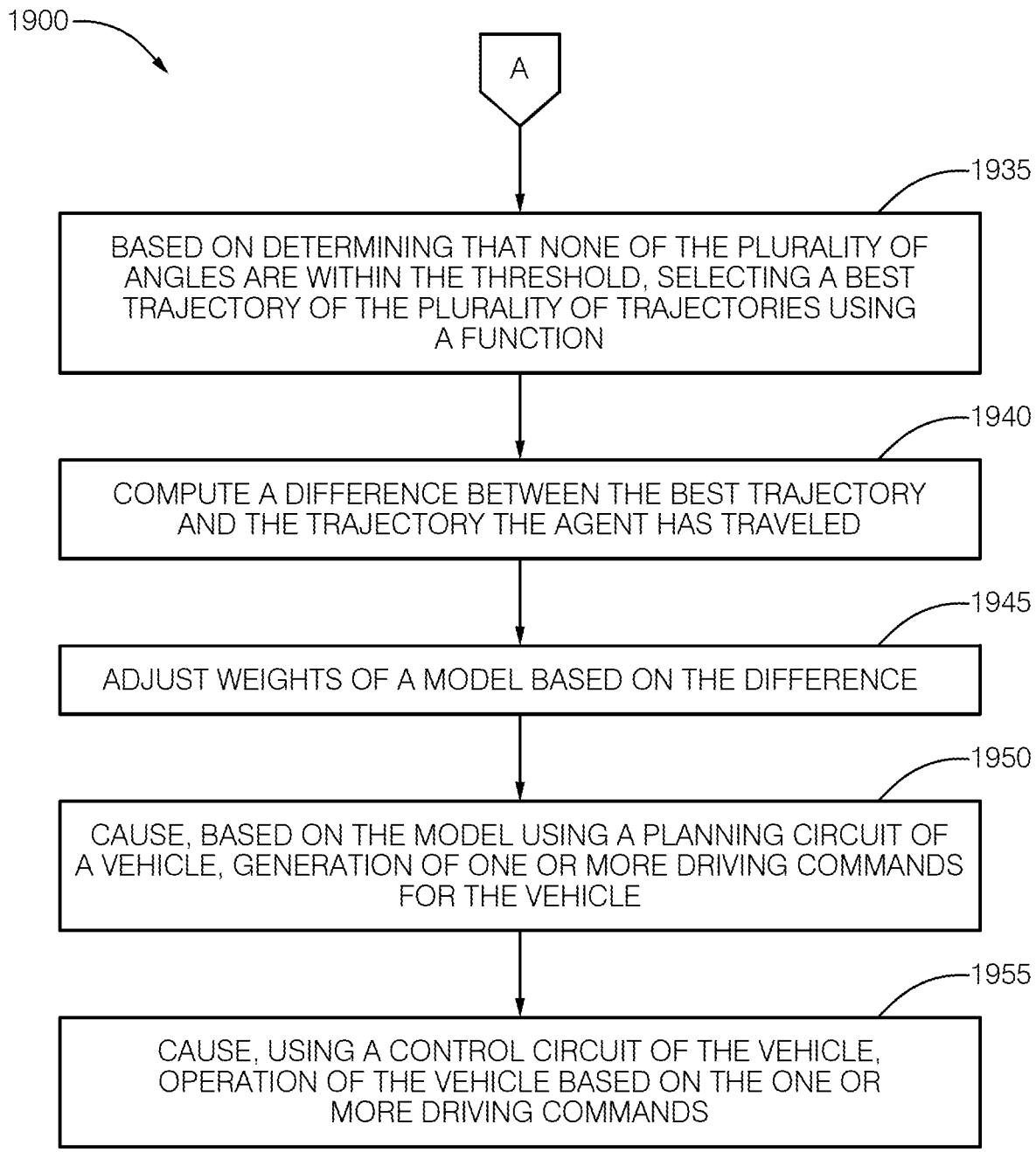

FIG. 19 is a block diagram of a process 1900 that can be performed to train a classifier to predict one or more trajectories of an agent. At 1905, the prediction system receives location data and past trajectory data for one or more objects detected by one or more sensors. For example, as discussed above, image 1300 of FIG. 13 can be received as the location data and past trajectory data. In an embodiment, the prediction system can receive the location data and the past trajectory data in a different format than image 1300. The prediction system can receive the past trajectory data for a past time interval (e.g., one second, two seconds, three seconds, or another suitable time interval). When the location data and the past trajectory data are received as part of an image, the image can include the past trajectory data for the one or more objects in a color coded format to indicate a corresponding past trajectory for each object of the one or more objects. For example, each of objects 1302 that is shown as having multiple colors with a gradually change of color to show time progression for the past trajectory data.

At 1910, the prediction system determines, using one or more processors and based on the location data and the past trajectory data, a set of features for the one or more objects. In the embodiments where the location data and the past trajectory data are received as an image, the prediction system receives the image as input, and outputs as an intermediary result a plurality of features for the image. At 1915, the prediction system combines (e.g., using one or more processors) the set of features with motion data of an agent (e.g., a vehicle, bicycle, pedestrian, or another suitable agent) to form a concatenated data set. For example, the prediction system can add, to the feature set, a vector that includes a speed, acceleration and yaw rate of the agent.

At 1920, the prediction system generates, based on the concatenated data set, a plurality of predicted trajectories. For example, the prediction system can input the concatenated data set into a neural network and receive, from the neural network, data for the predicted trajectories. The data for the predicted trajectories can be stored in a data structure that can include a plurality of fields for each predicted trajectory. The fields can include a coordinate field for storing the coordinates for each trajectory and a probability field for storing a probability for each trajectory. Other fields can be included in the data structure. In addition, the prediction system can retrieve a number of desired predicted trajectories from memory. The predicted trajectories can be retrieved with corresponding probabilities. In an embodiment, both the trajectories and the corresponding probability values can be predicted in parallel by the neural network. Thus, each of the plurality of the fields can include coordinates and also include the probability value for each trajectory. Thus, the loss of the neural network can contain two components: one for the classification that predict probability values for each trajectory and one for the regression that regresses to the coordinates (i.e., to predict the actual coordinate values that make up the trajectories).

At 1925, the prediction system calculates a plurality of angles between each of the plurality of predicted trajectories and the trajectory that the agent has traveled. For example, for a given predicted trajectory, the angle between that predicted trajectory and the trajectory the agent has traveled (i.e., the ground truth) can be computed by taking the straight line between the center of the agent and the last point in the traveled trajectory (the ground truth) and a straight line between the center of the vehicle and the last point in the predicted trajectory, and computing the angle value between the two lines (e.g., an angle in degrees in the range between zero and one hundred and eighty). In an embodiment, instead of angles, a different metric can be used in the prediction system. The prediction system can calculate a plurality of metrics between each of the plurality of predicted trajectories and a trajectory that the agent has traveled.

At 1930, the prediction system determines whether one or more of the plurality of angles is within a threshold. A threshold can be any suitable angle (e.g., seven degrees, eight degree, nine degrees, or another suitable angle) and can be obtained empirically. The prediction system can compare, for each predicted trajectory, an angle between that trajectory (as described above) and a threshold angle (e.g., seven degrees). In an embodiment, the prediction system can determine whether one or more of the plurality of metrics is within a threshold At 1935, if the prediction system, determines that none of the plurality of angles are within the threshold, selects a best trajectory of the plurality of predicted trajectories using a function. In many instances, the scenario where none of the plurality of angles are within a threshold occurs at the beginning of the training routine for the neural network. As the neural network has not been well trained yet, predicted trajectories are generally not very accurate resulting in large differences (e.g., large angles) between the projected trajectories and the traveled trajectory (i.e., the ground truth). In an embodiment, the function selects a trajectory of the plurality of predicted trajectories randomly. For example, the prediction system can retrieve the number of predicted trajectories and input that number into a random number generator. The prediction system receives the output of the random number generator and selects the corresponding predicted trajectory based on the output. If the prediction system determines a subset of modes with an angle value below the threshold, the prediction system selects a mode out of that subset of modes that minimizes the average of L2 norms. In an embodiment, instead of angles, the prediction system can use a different metric.

Various other ways can be used to select a predicted trajectory, sometimes referred to as best mode. For example, each time a predicted trajectory can be selected based on minimizing an average of a specific metric (e.g., an L2 norm between each predicted trajectory and the traveled trajectory). Taking that approach, the prediction system would encounter the issue of mode collapse. This is, because the prediction system (e.g., a neural network) selects one predicted trajectory (e.g., one mode) initially, and then computes the per-agent loss (described below) using that predicted trajectory mode, updating weights corresponding to that trajectory during the backpropagation processes. At the next training input, the prediction system would again select the same predicted trajectory as the best one because it has now improved that trajectory resulting in that same predicted trajectory providing the best metric (e.g., average of L2 norms). This scenario would lead to the mode collapse issue, where the prediction system would only train the model (e.g., a neural network) for one predicted trajectory. Thus, other possible trajectory training opportunities are lost. Selecting a random trajectory to be trained when no angles are within a threshold enables exploring all trajectories during training.

In an embodiment, the function selects a trajectory of the plurality of predicted trajectories based on a plurality of templates. As referred to in this document, a template refers to a template trajectory. The prediction system can generate templates by employing clustering techniques on training set data to obtain a number of templates equal to the number of predicted trajectories selected at the beginning of training. For example, the prediction system can analyze each traveled trajectory within the training set and determine a plurality of clusters of trajectories within that training set. For example, there may be a cluster of trajectories for turning right at a specific angle, a cluster of trajectories for turning left at a specific angle, a cluster of trajectories for moving straight, or another suitable cluster of trajectories. If the prediction system is configured to use templates while training, the angle comparison for each predicted trajectory is with each template trajectory (e.g., based on the angle between the predicted trajectory and the traveled trajectory being above the threshold). Thus, the predicted trajectory is selected based on the index of the template that was selected. That is, if the prediction system includes templates numbered 0, 1, 2, and the prediction system selects template 2 as the best matching template, the prediction system selects mode 2 as the best matching mode to use further in the model.

In an embodiment, to prevent mode collapse, the prediction system generates template trajectories based on high-level classes. These template trajectories are referred to as "fixed templates" because these template trajectories are generated for an agent and do not change depending on the different motions or states of the agent. For example, if the number of trajectories selected for training is three, the prediction system can generate templates for left-turn, right-turn, and straight trajectories. If the number of trajectories selected for training is five, the prediction system can generate template trajectories in five different directions. Thus, the prediction system generates the plurality of templates based on possible trajectories for the agent.

The prediction system can generate templates based on an initial set of conditions that are based on an agent state (e.g., velocity, acceleration, yaw rate, heading, and/or another suitable condition). These templates are sometimes referred to as dynamic templates because they change depending on the different motions or states of the agent. In this case, the prediction system generates a different set of templates for each condition. Thus, the prediction system generates the plurality of templates based on a state of the agent (e.g., velocity, acceleration, yaw rate, heading, and/or another suitable condition).

The prediction system can use the templates when an angle between a predicted trajectory and the traveled trajectory (e.g., the ground truth) is not within a threshold (e.g., instead of choosing a random predicted trajectory). However, the templates can also be used, for example, during some fixed number of iterations at the start of the training process, after which the prediction system switches to selecting the best predicted trajectory based on a metric (e.g., an L2 norm). Thus, the prediction system, based on determining that one or more of the plurality of angles are within the threshold (e.g., after a certain number of training iterations), selects a trajectory of the plurality of predicted trajectories based on a difference between the trajectory that the agent traveled and a corresponding trajectory for each predicted trajectory of the plurality of predicted trajectories.

In an embodiment, the prediction system selects a template at random, and uses the selected template as the traveled trajectory (i.e., the ground truth) for the predicted trajectory with the same index. This results in training the different predicted trajectories to start resembling the templates. In an embodiment, the prediction system stops using the templates and uses the traveled trajectories (i.e., the ground truths) after the predicted trajectories are trained to look more reasonable (sometimes referred to as a "burn-in" phase, when the prediction system does not identify any angles between a predicted trajectory and the traveled trajectory below a threshold).

Referring back to FIG. 19, at 1940, the prediction system computes a difference between the trajectory that was selected as the best matching trajectory and the trajectory the agent has traveled. For example, the prediction system can compute the per-agent loss by summing the regression loss for the selected predicted trajectory (i.e., the best mode) and also the classification loss for all of the predicted trajectories (i.e., modes). For example, one method to sum the regression loss is to use Smooth L1 loss and one way to sum the classification loss is to use cross entropy. Thus, the total loss can be a sum of regression loss using Smooth L1 loss and cross entropy. To compute the loss across the full training set, the prediction system sums all the per-agent losses (e.g., the loss for each instance of location data and past trajectory data, for example, image 1300).

At 1945, the prediction system adjusts weights of a model (e.g., a neural network) based on the difference. For example, the differences are back-propagated through the model to adjust the weights of the model for better performance during the next iteration.

At 1950, the prediction system causes, based on the model using a planning circuit of a vehicle, generation of one or more driving commands for the vehicle. The prediction system can be located, at least partially, in a vehicle that is using the prediction system to predict how agents (e.g., vehicles, pedestrians, bicyclists) will move. Thus, the planning circuit of the vehicle can use one or more predicted trajectories for the objects to generate driving commands for the vehicle. In an embodiment, the planning circuit can use the predicted trajectories and the associated probabilities to generate the driving commands. That is, the prediction system can inform planning of the possible trajectories and also the likelihood how that each one is to occur. Thus, a vehicle can include one or more computer-readable media storing computer-executable instructions and one or more processors configured to execute the computer-executable instructions carrying out process 1900.

The prediction system can, at least partially, reside outside of the vehicle (e.g., in a datacenter 204A as shown in FIG. 2). Thus, the prediction system can transmit the predicted trajectories for the objects detected by the vehicle to the vehicle and the vehicle (e.g., using the planning circuit) can generate driving commands based on the received trajectories. In this scenario, the driving commands can be generated remotely from the vehicle (e.g., at a datacenter 204A as shown in FIG. 2) and are transmitted to the vehicle for execution.

At 1955, the prediction system causes, using a control circuit of the vehicle, operation of the vehicle based on the one or more driving commands. For example, the planning circuit can transmit the driving commands to the control circuit for execution. The control circuit of the vehicle can interpret and execute the commands to drive the vehicle on a trajectory that avoids the detected objects based on the predicted trajectory of those objects.

In an embodiment, a trajectory that is within an ε (epsilon) value of the ground truth is not penalized. In one approach, the classification is reformulated as a multi-label problem. For example, y is used to denote an array of 1s and 0s, where each entry is 1 if that trajectory in a trajectory set is within ε of the ground truth and 0 otherwise. The new classification loss function is a modified entropy loss function, MCE, defined as follows in equation (1).

$$MCE(\hat{y}, y) = \frac{1}{\sum_k y_i} \sum_i y_i \left( -\hat{y}_i[i] + \log\left(\sum_k \exp(\hat{y}_k)\right) \right) \quad (1)$$

In equation (1), i is used to index the trajectories (classes). The MCE loss averages the log softmax values of the logits for the trajectories that are within an ε value of the ground truth. The softmax function refers to a function that takes as input a vector of K real numbers and normalizes it into a probability distribution including K probabilities proportional to the exponentials of the input numbers. The logit function refers to a type of function that creates a map of probability values. Different distance functions and values of E can be used, for example, the mean or max $L^2$ distance functions.

In another approach, a weighted cross-entropy loss function is used. For example, d is used to denote the vector storing the element-wise $L^2$ distance between each trajectory in the trajectory set and the ground truth. For each entry in d that is smaller than ε, the entry is replaced with 0. The normalization of d is denoted by $d_{norm}$. The vector d sums to 1. The array y denotes an array of 1s and 0s, where each entry is 1 if that trajectory is the closest trajectory set to the ground truth and 0 otherwise. The new classification loss function is expressed as follows in equation (2).

$$\sum_i \frac{1}{K} \sum_k d_{normik} y_{ik} \log(\hat{y}_{ik}) \quad (2)$$

In equation (2), K denotes the size of the trajectory. Equation (2) represents a cross-entropy loss but weighted by the distance.

In an embodiment, a penalty is added for trajectories that go off the road. In one approach, the model is used to classify which trajectories are off the road. For example, the expression L(ŷ, y) denotes any of the classification loss functions described above or the basic CoverNet loss function. An array r denotes an array of 1s and 0s where each entry is 1 if that trajectory in the trajectory set is entirely within the drivable area and 0 otherwise. The off road penalty is defines as follows in equation (3).

$$\Omega(\hat{y}) = \frac{1}{n} \sum_i bce(\sigma(\hat{y}_i), r_i) \quad (3)$$

The bce term denotes the binary cross-entropy. The new loss function is expressed as follows in equation (4).

$$L(\hat{y},y)+\lambda\Omega(\hat{y}). \quad (4)$$

In equation (4), λ∈[0,∞]. An advantage of this approach is that the off-road penalty is formulated as a classification problem so the classification loss function and the off-road penalty can be naturally combined without rescaling the units.

Additional Embodiments

In an embodiment, one or more processors receive location data and past trajectory data for one or more objects detected by one or more sensors. The one or more processors determine, based on the location data and the past trajectory data, a set of features for the one or more objects. The one or more processors combine the set of features with motion data of an agent to form a concatenated data set. Based on the concatenated data set, a trajectory lattice is generated including multiple possible trajectories for the agent. Each trajectory in the trajectory lattice is assigned a probability. Based on the trajectory lattice, one or more predicted trajectories for the agent are determined. Based on the one or more predicted trajectories using a planning circuit of a vehicle, generation of one or more driving commands for the vehicle is caused. Using a control circuit of the vehicle, operation of the vehicle based on the one or more driving commands is caused.

In an embodiment, generating the trajectory lattice for the agent includes inputting the concatenated data set into a neural network. From the neural network, data for the trajectory lattice is received.

In an embodiment, determining, based on the trajectory lattice, the trajectory for the agent includes receiving one or more of speed, acceleration, and yaw rate of the agent. In the trajectory lattice, those trajectories that the agent cannot travel based on the one or more of the speed, acceleration, and yaw rate of the agent are identified. Those trajectories are removed from the trajectory lattice.

In an embodiment, identifying, based on the trajectory lattice, the trajectory for the agent includes receiving one or more of road rules data and road marking data. In the trajectory lattice, those trajectories that the agent cannot travel based on the one or more of the road rules data and the road marking data are identified. Those trajectories are removed from the trajectory lattice.

In an embodiment, receiving the past trajectory data includes receiving a trajectory of each object of the one or more object for a past time interval.

In an embodiment, receiving the location data and the past trajectory data includes receiving an image. The image includes the location data for the one or more objects and the past trajectory data for the one or more objects. The past trajectory data is color coded to indicate a corresponding past trajectory for each object of the one or more objects relative to the location data.

In an embodiment, determining the set of features for the one or more objects, includes inputting the image into a classifier, and receiving from the classifier multiple features for the image.

In an embodiment, the one or more processors are located in the vehicle.

In an embodiment, the one or more processors are located remotely from the vehicle.

In an embodiment, training location data (e.g., position data for vehicles, bicycles, pedestrians, etc.) and training past trajectory data for one or more training objects is received. Based on the training location data and the training past trajectory data, a set of training features for the one or more training objects is determined. The set of training features is combined with training motion data of a training agent (e.g., speed, acceleration, and yaw rate of a vehicle) to form a training concatenated data set. Based on the training concatenated data set, a training trajectory lattice is determined. The training trajectory lattice includes a training set of predicated trajectories. Each trajectory in the trajectory lattice is assigned a probability. Based on the training trajectory lattice, one or more training trajectories for the training agent are determined. The one or more training trajectories are compared with a known trajectory of the training agent. Weights of a model are updated according to the comparing.

In an embodiment, updating the weights of the model according to the comparing includes propagating a difference between each of the one or more training trajectories and the known trajectory through the model.

In an embodiment, location data and past trajectory data for one or more objects are received. One or more processors determine, based on the location data and the past trajectory data, a set of features for the one or more objects. The set of features is combined with motion data of an agent to form a concatenated data set. From the concatenated data set, multiple predicted trajectories are determined. Multiple angles are calculated between each of the multiple predicted trajectories and a trajectory that the agent has traveled. Whether one or more of the multiple angles is within a threshold is determined. Based on determining that none of the multiple angles is within the threshold, a best trajectory of the multiple predicted trajectories using a function is selected. A difference between the best trajectory and the trajectory the agent has traveled is computed. Weights of a model based on the difference are adjusted. Based on the model and using a planning circuit of a vehicle, generation of one or more driving commands for the vehicle is caused. A control circuit of the vehicle causes operation of the vehicle based on the one or more driving commands.

In an embodiment, generating the multiple predicted trajectories includes inputting the concatenated data set into a neural network. From the neural network, the multiple predicted trajectories are received.

In an embodiment, based on determining that one or more of the multiple angles are within the threshold, a trajectory of the multiple predicted trajectories is selected based on a difference between the trajectory that the agent traveled and a corresponding trajectory for each predicted trajectory of the multiple predicted trajectories.

In an embodiment, the function selects a trajectory of the multiple predicted trajectories randomly.

In an embodiment, the function selects a trajectory of the multiple predicted trajectories based on multiple templates.

In an embodiment, a clustering operation is performed on a training set to obtain the multiple templates.

In an embodiment, the multiple templates are generated based on possible trajectories for one or more agents.

In an embodiment, each template of the multiple templates is generated based on a state of the agent.

In an embodiment, receiving the location data and the past trajectory data includes receiving an image. The image includes the location data for the one or more objects and the past trajectory data for the one or more objects. The past trajectory data is color coded to indicate a corresponding past trajectory for each object of the one or more objects.

The actions described in relation to the multi-modal trajectory prediction can be stored on a non-transitory computer-readable storage medium as one or more programs for execution by one or more processors (e.g., on a vehicle, at a datacenter, or another suitable location). The one or more programs can include instructions which, when executed by the one or more processors, cause performance of the computer implemented method(s) described above.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A computer implemented method comprising:
   receiving, by one or more processors, location data and past trajectory data for one or more objects detected by one or more sensors;
   determining, by the one or more processors, a set of features for the one or more objects based on the location data and the past trajectory data;
   combining, by the one or more processors, the set of features, a trajectory traveled by an agent, and motion data of the agent to form a concatenated data set;
   generating, by the one or more processors, a trajectory lattice corresponding to the agent based on the concatenated data set, wherein the trajectory lattice is a plurality of possible trajectories with a respective probabilities;
   determining, by the one or more processors, one or more predicted trajectories for the agent based on the trajectory lattice;
   generating, by the one or more processors, one or more driving commands for a vehicle based on the one or more predicted trajectories; and
   operating, by the one or more processors, the vehicle based on the one or more driving commands.

2. The method of claim 1, comprising dynamically generating the trajectory lattice based on a state of the agent.

3. The method of claim 1, comprising removing trajectories from the trajectory lattice that the agent cannot travel based on road rules data or road marking data to obtain an updated trajectory lattice, and determining predicted trajectories based on the updated trajectory lattice.

4. The method of claim 1, wherein receiving the past trajectory data comprises receiving, by the one or more processors, a trajectory of each object of the one or more object for a past time interval.

5. The method of claim 1, wherein receiving the location data and the past trajectory data comprises receiving, by the one or more processors, an image including the location data for the one or more objects and the past trajectory data for the one or more objects, wherein the past trajectory data is color coded to indicate a corresponding past trajectory for each object of the one or more objects.

6. The method of claim 5, wherein determining the set of features for the one or more objects, comprises:
inputting the image into a classifier; and
receiving a plurality of features for the image from the classifier.

7. The method of claim 1, wherein generating the trajectory lattice comprises generating a data structure with a plurality of fields for each trajectory in the trajectory lattice comprising a coordinate field and a probability field.

8. The method of claim 1, further comprising:
receiving training location data and training past trajectory data for one or more training objects;
determining a set of training features for the one or more training objects based on the training location data and the training past trajectory data;
combining the set of training features with training motion data of an agent to form a training concatenated data set;
generating, based on the training concatenated data set, a training trajectory lattice, wherein the training trajectory lattice comprises a training plurality of predicted trajectories, and wherein each of the training plurality of predicted trajectories is assigned a training probability of a training agent traveling a respective trajectory;
determining, based on the training trajectory lattice, one or more training trajectories for the training agent;
comparing the one or more training trajectories with a known trajectory of the training agent; and
updating weights of a neural network according to the comparing, wherein the neural network outputs the trajectory lattice.

9. The method of claim 8, wherein updating the weights of the neural network according to the comparing comprises propagating a difference between each of the one or more training trajectories and the known trajectory through the neural network.

10. A system, comprising:
at least one hardware processor; and
at least one computer-readable medium storing computer-executable instructions;
wherein the computer-executable instructions, when executed by the at least one hardware processor, cause the system to:
receive location data and past trajectory data for one or more objects detected by one or more sensors;
determine a set of features for the one or more objects based on the location data and the past trajectory data;
combine the set of features, a trajectory traveled by an agent, and motion data of the agent to form a concatenated data set;
generate a trajectory lattice corresponding to the agent based on the concatenated data set, wherein the trajectory lattice is a plurality of possible trajectories with a respective probabilities;
determine one or more predicted trajectories for the agent based on the trajectory lattice;
generate one or more driving commands for a vehicle based on the one or more predicted trajectories; and
operate the vehicle based on the one or more driving commands.

11. The system of claim 10, wherein the computer-executable instructions cause the system to dynamically generating the trajectory lattice based on a state of the agent.

12. The system of claim 10, wherein the computer-executable instructions cause the system to remove trajectories from the trajectory lattice that the agent cannot travel based on road rules data or road marking data to obtain an updated trajectory lattice, and determine predicted trajectories based on the updated trajectory lattice.

13. The system of claim 10, wherein the computer-executable instructions cause the system to receive the past trajectory data, comprising receiving a trajectory of each object of the one or more object for a past time interval.

14. The system of claim 10, wherein the computer-executable instructions cause the system to receive the location data and the past trajectory data, comprising receiving an image including the location data for the one or more objects and the past trajectory data for the one or more objects, wherein the past trajectory data is color coded to indicate a corresponding past trajectory for each object of the one or more objects.

15. The system of claim 14, wherein the computer-executable instructions cause the system to determine the set of features for the one or more objects, comprising:
inputting the image into a classifier; and
receiving a plurality of features for the image from the classifier.

16. The system of claim 10, wherein the computer-executable instructions cause the system to generate the trajectory lattice comprising generating a data structure with a plurality of fields for each trajectory in the trajectory lattice comprising a coordinate field and a probability field.

17. A non-transitory computer-readable storage medium comprising one or more programs for execution by one or more processors, the one or more programs including instructions which, when executed by the one or more processors, cause the one or more processors to:
receive location data and past trajectory data for one or more objects detected by one or more sensors;
determine a set of features for the one or more objects based on the location data and the past trajectory data;
combine the set of features, a trajectory traveled by an agent, and motion data of the agent to form a concatenated data set;
generate a trajectory lattice corresponding to the agent based on the concatenated data set, wherein the trajectory lattice is a plurality of possible trajectories with a respective probabilities;
determine one or more predicted trajectories for the agent based on the trajectory lattice;
generate one or more driving commands for a vehicle based on the one or more predicted trajectories; and
operate the vehicle based on the one or more driving commands.

18. The computer-readable storage medium of claim 17, comprising dynamically generating the trajectory lattice based on a state of the agent.

19. The computer-readable storage medium of claim 17, comprising removing trajectories from the trajectory lattice that the agent cannot travel based on road rules data or road marking data to obtain an updated trajectory lattice, and determining predicted trajectories based on the updated trajectory lattice.

20. The computer-readable storage medium of claim 17, wherein receiving the past trajectory data comprises receiving a trajectory of each object of the one or more object for a past time interval.

\* \* \* \* \*